US 7,658,675 B2

United States Patent
Hotta

(10) Patent No.: US 7,658,675 B2
(45) Date of Patent: Feb. 9, 2010

(54) GAME APPARATUS UTILIZING TOUCH PANEL AND STORAGE MEDIUM STORING GAME PROGRAM

(75) Inventor: Takuji Hotta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 430 days.

(21) Appl. No.: 11/183,737

(22) Filed: Jul. 19, 2005

(65) Prior Publication Data

US 2006/0025218 A1 Feb. 2, 2006

(30) Foreign Application Priority Data

Jul. 29, 2004 (JP) .............................. 2004-221307

(51) Int. Cl.
*A63F 13/00* (2006.01)
(52) U.S. Cl. ...................................... 463/37
(58) Field of Classification Search ................. 463/37; 178/18.04
See application file for complete search history.

(56) References Cited

U.S. PATENT DOCUMENTS

| | | | |
|---|---|---|---|
| 2003/0063073 | A1 | 4/2003 | Geaghan et al. |
| 2003/0085882 | A1 | 5/2003 | Lu |
| 2004/0119701 | A1 | 6/2004 | Mulligan et al. |
| 2004/0248650 | A1 | 12/2004 | Colbert et al. |
| 2005/0024344 | A1 | 2/2005 | Trachte |
| 2005/0049049 | A1* | 3/2005 | Griswold et al. .............. 463/46 |
| 2005/0162402 | A1 | 7/2005 | Watanachote |

FOREIGN PATENT DOCUMENTS

| | | |
|---|---|---|
| JP | 05-108266 | 4/1993 |
| JP | 07-230352 | 8/1995 |
| JP | 2000-163031 | 6/2000 |
| JP | 2001-290585 | 10/2001 |
| JP | 2002-000939 | 1/2002 |

OTHER PUBLICATIONS

Machine to English Translation of JP2001021560 including the detailed description.*
Office Action dated Sep. 15, 2009 issued in corresponding Japanese Application No. 2004-221307.

* cited by examiner

*Primary Examiner*—Corbett B Coburn
*Assistant Examiner*—Malina K Rustemeyer
(74) *Attorney, Agent, or Firm*—Nixon & Vanderhye P.C.

(57) ABSTRACT

A game apparatus includes a touch panel on which at least two pointing positions are simultaneously detectable. In response to an operation of the touch panel by a player, coordinates values of the detected two points are detected, and at least one of a distance between the two points and an angle of the line connecting the two points is calculated. Furthermore, change amounts of the distance and angle between the two points are calculated. A movement parameter such as a travel speed and a turning angle is set on the basis of at least one of the calculated distance and angle, and the movement of the character such as travel and turning is controlled on the basis of the movement parameter. In addition, when a pointing state of the two points is changed, the movement parameter is changed on the basis of a change amount, and the movement of the character is controlled on the basis of the movement parameter.

8 Claims, 20 Drawing Sheets

DISTANCE BETWEEN TWO POINTS $$L = \sqrt{(X2-X1)^2 + (Y2-Y1)^2} \quad \cdots(1)$$

ANGLE BETWEEN TWO POINTS $$\cos\theta = \frac{X2-X1}{L} \quad \cdots(2)$$

CENTRAL POINT BETWEEN TWO POINTS $$P = ((X1+X2)/2, \ (Y1+Y2)/2) \quad \cdots(3)$$

GAME APPARATUS UTILIZING TOUCH PANEL AND STORAGE MEDIUM STORING GAME PROGRAM

BACKGROUND OF THE INVENTION

1. Field of the Invention

The present invention relates to a game apparatus utilizing touch panel and a storage medium storing a game program. More specifically, the present invention relates to a game apparatus utilizing touch panel that permits simultaneously detecting at least two pointing positions, and a storage medium storing a game program to be utilized therefore.

2. Description of the Prior Art

One example of such a kind of a technique for executing an operation by utilizing a touch panel that permits simultaneously detecting a plurality of pointing positions is disclosed in a document 1 (Japanese Patent Laying-open No. 2001-290585). In the technique of the document 1, a plurality of pointing positions are simultaneously detected by utilizing a touch panel, etc., and the plurality of pointing positions are detected once again after movement of the pointing positions, and whereby, moving traces of the respective pointing positions are obtained. This permits interpreting user's instruction and executing the instructed operation. For example, after obtaining changes of distances between the respective pointing positions, an object is enlarged or reduced according to this change amount, or in correspondence with angles of lines connecting the pointing positions and the change data, the object is subjected to a rotating operation to the right or to the left.

However, the document 1 technique merely performs an enlarged or reduced operation and rotating operation in correspondence with moving traces of the plurality of pointing positions, and is not applied to a game. That is, in the document 1, it is not clear how characters appearing in a game are to be controlled, for example.

SUMMARY OF THE INVENTION

Therefore, it is a primary object of the present invention to provide a novel game apparatus utilizing touch panel and storage medium storing a game program.

Another object of the present invention is to provide a game apparatus utilizing touch panel and a storage medium storing a game program that are able to control a movement of a character appearing in a game space by use of a touch panel capable of simultaneously detecting two pointing positions.

The game apparatus according to this invention is a game apparatus utilizing touch panel, and comprises a display means, a touch panel, a coordinates detecting means, a positional relationship calculating means, a movement parameter setting means, and a character controlling means. The display means displays a game space including a character to be operated by a player. The touch panel is operated by the player, and allows simultaneous detection of least two pointing positions. The coordinates detecting means detects coordinates values of the two pointing positions detected according to an operation of the touch panel by the player. The positional relationship calculating means calculates at least one of a distance between the two points detected by the coordinates detecting means and an angle of a line connecting the two points. The movement parameter setting means sets a movement parameter of the character on the basis of at least one of the distance and angle calculated by the positional relationship calculating means. The character controlling means controls a movement of the character on the basis of the movement parameter set by the movement parameter setting means.

More specifically, the game apparatus (10: a reference numeral corresponding in the embodiment described later and so forth) is a game apparatus utilizing a touch panel (22). The display means (42, 12, 14, 50, 52, 60, 72, S3, S75, S111) displays a game space including the character (100) to be operated by the player. The touch panel can simultaneously detect at least the two pointing positions. The player operates the character through the operation of the touch panel by pointing the two points, for example. The coordinates detecting means (42, 74, S7) detects the coordinate values ((X1, Y1), (X2, Y2)) detected through the operation of the touch panel by the player. The positional relationship calculating means (42, 76, S9) calculates at least one of the distance between the two points and the angle of the line connecting the two points. Here, the angle of the line connecting the two points means an angle formed by the line connecting the two points and a reference line such as a horizontal line. Thus, the operating state or pointing state of the two points by the player is calculated. The movement parameter setting means (42, 78, S115) sets the movement parameter of the character on the basis of at least one of the calculated distance and angle. Then, the character controlling means (42, 80, S17) controls the movement of the character on the basis of the set movement parameter. Accordingly, the movement parameter of the character is set on the basis of the distance between the two points pointed by the player and the angle of the line connecting the two points, and this allows the character to be moved in correspondence with the distance between the two points or the angle of the line connecting the two points.

In one embodiment, the positional relationship calculating means further includes a change amount calculating means for calculating a change amount of at least one of the distance and the angle. The movement parameter setting means changes the movement parameter on the basis of at least one of the change amount of the distance and the change amount of the angle. The character controlling means controls the movement of the character on the basis of the changed movement parameter.

That is, the change amount calculating means (42, 82, S11) calculates the change amount of at least one of the distance between the two points and the angle of the line connecting the two points. The movement parameter setting means (S19) changes the movement parameter on the basis of at least one of the change amount of the distance and the change amount of the angle. Then, the character controlling means (S21) controls the movement of the character on the basis of the changed movement parameter. Accordingly, the movement of the character is controlled so as to change in correspondence with the change of the distance between the two points or the angle of the line connecting the two points.

In another embodiment, the change amount calculating means calculates the change amount every unit of time. Accordingly, the change amount is calculated every time that a unit of time elapses, and therefore, the movement of the character can be changed every time that a unit of time elapses.

In one aspect, a first change amount determining means for determining whether or not the change amount calculated by the change amount calculating means is equal to or less than the first predetermined value is further provided. The character controlling means controls a movement of the character on the basis of the changed movement parameter when it is determined that the change amount is not equal to or less than the first predetermined value, and causes the character to perform a first special action when it is determined that the change amount is equal to or less than the first predetermined value.

More specifically, the first change amount determining means (S91, S101) determines whether or not the change amount is equal to or less than the first predetermined value (L1, θ1), and the character controlling means controls the movement of the character in correspondence with the determination result. That is, the character controlling means perform a control on the basis of the movement parameter when the change amount is not equal to or less than the first predetermined value (S99, S109), and causes the character to perform the first special action when the change amount is equal to or less than the first predetermined value (S93, S103). Accordingly, when the change amount is equal to or less than the predetermined value, the character is made to perform the special action, capable of increasing interest of the game.

In another aspect, the second change amount determining means for determining whether or not the change amount calculated by the change amount calculating means is equal to or more than a second predetermined value is further provided. The character controlling means controls the movement of the character on the basis of the changed movement parameter when it is determined that the change amount is not equal to or more than the second predetermined value, and causes the character to perform a second special action when it is determined that the change amount is equal to or more than the second predetermined value.

More specifically, the second change amount determining means (S95, S105) determines whether or not the change amount is equal to or more than the second predetermined value, and controls the movement of the character according to the determination result. That is, the character controlling means performs a control on the basis of the movement parameter when the change amount is not equal to or more than the second predetermined value (S99, S109), and causes the character to perform the second special action when the change amount is equal to or more than the second predetermined value (S97, S107). Accordingly, when the change amount is equal to or more than the predetermined value, the character is made to perform the special action, capable of increasing interest of the game.

In another embodiment, the movement parameter setting means (S81) changes a travel speed as the movement parameter on the basis of the change amount of the distance. Accordingly, the player can change the travel speed of the character by changing the distance between the two points.

In the other embodiment, the movement parameter setting means (S83) changes a turning angle as the movement parameter on the basis of the change amount of the angle. Accordingly, the player can change the turning angle of the character by changing the angle of the line connecting the two points.

In a further embodiment, the movement parameter setting means (S61) sets a travel speed as the movement parameter on the basis of the distance. Accordingly, it is possible to control the travel speed of the character in correspondence with the distance between the two points.

In another embodiment, the movement parameter setting means sets a measure and direction of the turning angle as the movement parameter on the basis of the measure and direction of the angle. That is, the movement parameter setting means (S63) can set the turning angle on the basis of the angle, and thus can control the turning angle of the character in correspondence with the angle of the line connecting the two points.

In the other embodiment, the positional relationship calculating means (S45) further calculates a central coordinates value of the two points. The movement parameter setting means (S65, S85) sets the display position as the movement parameter on the basis of the central coordinates value. Accordingly, it is possible to control the display position of the character in correspondence with the central coordinates value between the two points.

The storage medium storing a game program according to this invention is a storage medium storing a game program in a game apparatus utilizing touch panel provided with a display means for displaying a game space including a character to be operated by a player, and a touch panel to be operated by the player for allowing simultaneous detection of at least the two pointing positions. The game program of the storage medium causes the processor of the game apparatus to execute the coordinates detecting step, a positional relationship calculating step, a movement parameter setting step, and a character controlling step. The coordinates detecting step detects coordinates values of the two pointing positions detected according to an operation of the touch panel by the player. The positional relationship calculating step calculates at least one of a distance between the two points detected by the coordinates detecting step and an angle of a line connecting the two points. The movement parameter setting step sets a movement parameter of the character on the basis of at least one of the distance and angle calculated by the positional relationship calculating step. The character controlling step controls a movement of the character on the basis of the movement parameter set by the movement parameter setting step.

In one embodiment, the positional relationship calculating step further includes a change amount calculating step for calculating a change amount of at least one of the distance and the angle. The movement parameter setting step changes the movement parameter on the basis of at least one of the change amount of the distance and the change amount of the angle. The character controlling step controls the movement of the character on the basis of the changed movement parameter.

In such the storage medium storing a game program also, it is possible to control the movement of the character on the basis of the distance between the two points and the angle of the line connecting the two points similar to the above-described game apparatus.

According to this invention, at least one of the distance between the two points and angle of the line connecting the two points detected through the operation of the touch panel by the player is calculated, and the movement parameter of the character appearing in the game space is set on the basis of at least one of the calculated distance and angle. Thus, it is possible to control the movement of the character in correspondence with the distance between the two points or the angle of the line connecting the two points.

In addition, the change amount of at least one of the distance and angle between the two points is calculated, and on the basis of the calculated change amount, the movement parameter of the character is changed. Thus, the player can change the movement of the character by changing the distance between the two points or the angle of the line connecting the two points.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
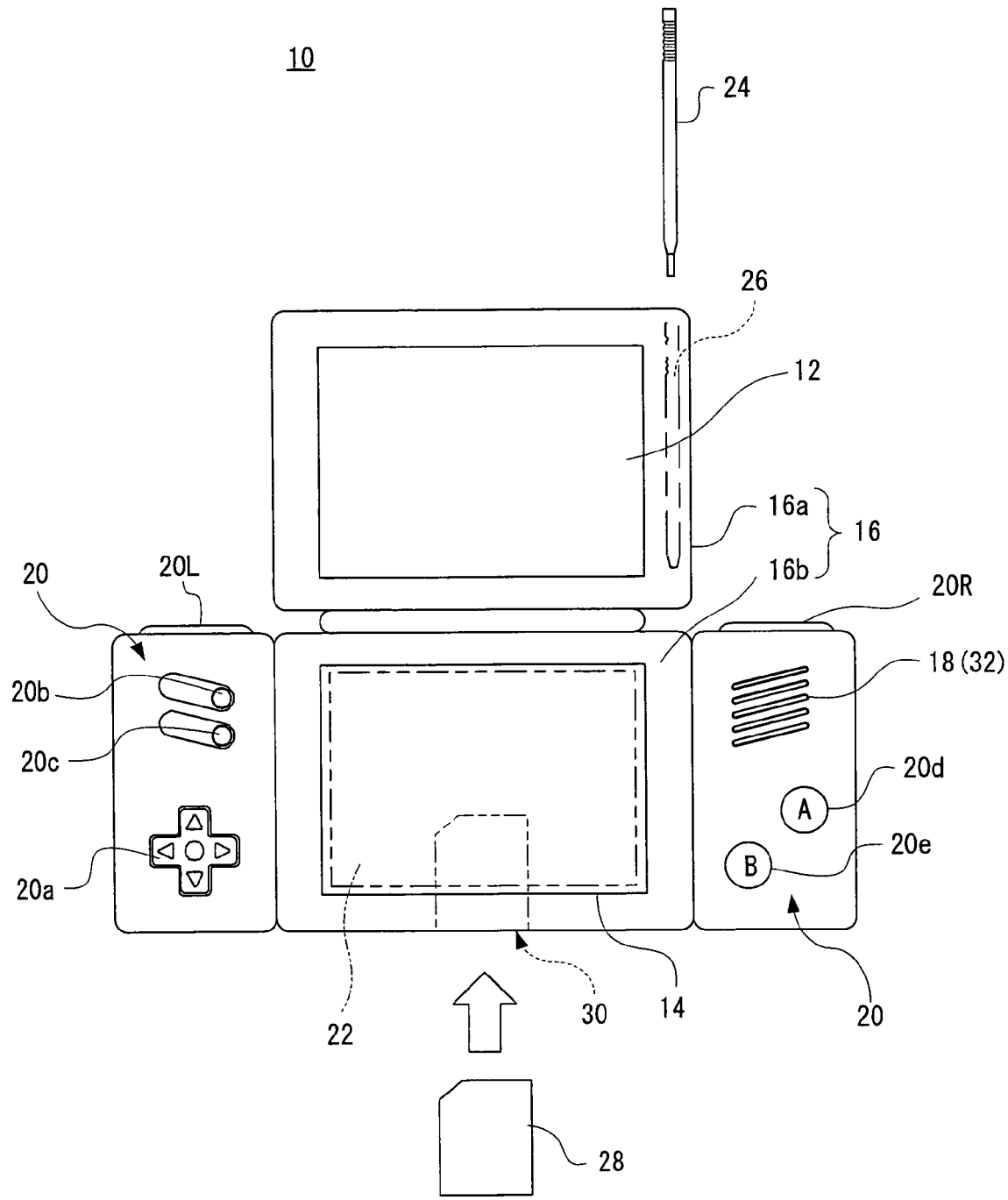
FIG. 1 is an appearance view showing one example of a game apparatus of one embodiment of the present invention.

Referring to FIG. 1, a game apparatus 10 of one embodiment of the present invention includes a first liquid crystal display (LCD) 12 and a second LCD 14. The LCD 12 and the LCD 14 are provided on a housing 16 so as to be arranged in a predetermined position. In this embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display, a plasma display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

A function of each switch of the operating switch 20 is set for each game as necessary. For example, the direction instructing switch 20a functions as a digital joystick, and is utilized for instructing a moving direction of a player character (or player object) to be operated by a player, instructing a moving direction of a cursor, and so forth by operating at least one of four depression portions. The start switch 20b is formed by a push button, and is utilized for starting (restarting), temporarily stopping (pausing) a game, and so forth. The select switch 20c is formed by the push button, and utilized for selecting a game mode, etc.

The action switch 20d, that is, the A button 20d is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button 20e is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

The game apparatus 10 is a game apparatus utilizing touch panel, and the LCD 14 is provided with a touch panel 22 on a top surface. The touch panel 22 includes touch panels that allows simultaneous detection of at least two pointing positions. More specifically, an optical system utilizing infrared rays (retroreflective system), or the like may be employed. As one example of multi-points simultaneous recognizable touch panel products, "NEXTRAX" manufactured by Cadcenter Co. Ltd. is employed.

(http://www.nextrax-cadcenter.com/).

In response to an operation (touch operation) by depressing, stroking (touching), and so forth with a stick 24, a pen (stylus pen), or a finger (hereinafter, referred to as "stick 24, etc".) on a top surface of the touch panel 22, the touch panel 22 detects a pointing position of the stick 24, etc. and outputs coordinates data indicating a coordinates value of the pointing position. If the player touches two points, for example, the coordinates data including coordinates values of two pointing positions is output.

It is noted that in this embodiment, a resolution of the display surface of the LCD 14 is 256 dots×192 dots (this is true or roughly true for the LCD 12), and a detection accuracy of a detection surface of the touch panel 22 is also rendered 256 dots×192 dots in correspondence to the resolution of the display surface. However, detection accuracy of the touch panel 22 may be lower than the resolution of the display surface, or higher than it.

For example, a game screen to be viewed by the player may be displayed on the LCD 12, and a game screen being brought into association with the screen of the LCD 12 and to be viewed and operated by the player may be displayed on the LCD 14 with the touch panel 22. The player character appearing in the game space may be included on the game screen displayed on the LCD 12. Furthermore, on the game screen displayed on the LCD 14, a guide or instruction for teaching how to operate the player character through the touch input by use of the stick 24, etc. may be included, and an object, icon, textual information, etc. playable with a touch operation may be included.

It is noted that in a case that the object, etc. playable through the touch operation is displayed on the LCD14, the player can select or operate the object, instruct a coordinates input, and so forth by operating the touch panel 22 through a direct touch of the object by the stick 24, etc. Furthermore, depending on the kind of the game, it is possible to perform other various input instructions, etc. Examples are to select a command represented by textual information, an icon, etc. displayed on the display screen of the LCD 14, to instruct a scrolling (gradual moving display) direction of the game screen (map) to be displayed on the LCD 12.

Thus, the game apparatus 10 has the LCD 12 and the LCD 14 as a display portion of two screens, and the touch panel 22 is provided on an upper surface of any one of them (LCD 14 in this embodiment). Thus, the game apparatus 10 has the two screens (LCD 12, 14) and two systems of the operating portions (20, 22).

It is noted that the game apparatus 10 is for intending to control a movement of the player character appearing in the game space on the basis of a touch panel operation. Accordingly, some of them relating to the movement control of the player character out of the operation contents of the above-described respective operating switches 20 may be assigned to the operation of the touch panel 22, and therefore, the operation contents thereof may be set so as not to function even in a case of the presence of an operation from the operating switch 20.

Furthermore, in this embodiment, the stick 24 can be inserted into a housing portion (housing slot) 26 provided in proximity to a side surface (right side surface) of the upper housing 16a, for example, and taken out therefrom as necessary. It is noted that in a case of not preparing the stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 inside the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
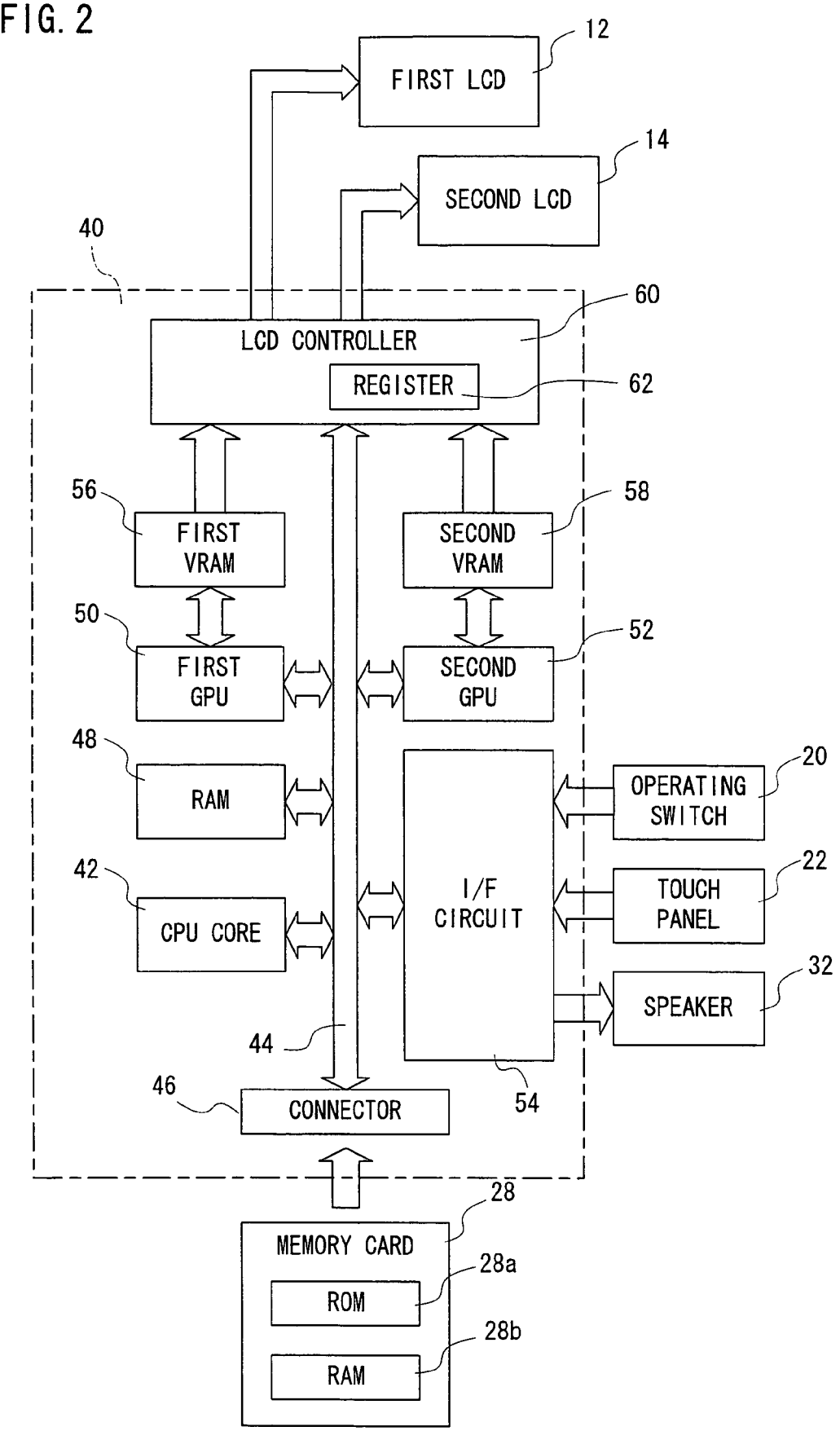
FIG. 2 is a block diagram showing an electrical configuration of the game apparatus of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. are mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, message image, etc.), data of the sound or music (sound data) necessary for the game, etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data and flag data) temporarily generated in correspondence with a progress of the game in the RAM 48.

It is noted that such the game program, the image data, the sound data, etc. are loaded from the ROM 28a entirely at a time, or partially and sequentially as necessary so as to be stored (loaded) into the RAM 48.

Each of the GPU 50 and the GPU 52 forms a part of a rendering means, is constructed by a single chip ASIC, for example, and receives a graphics command (construction command) from the CPU core 42 to generate game image data according to the graphics command. It is noted that the CPU core 42 applies to each of the GPU 50 and the GPU 52 an image generating program (included in the game program) required to generate the game image data in addition to the graphics command.

It is noted that each of the GPU 50 and the GPU 52 gains access to the RAM 48 to fetch data (image data: data such as polygon, texture, etc.) required to execute the construction command by the GPU 50 and the GPU 52.

Furthermore, the GPU 50 is connected with a first video RAM (hereinafter, referred to as "VRAM") 56, and the GPU 52 is connected with a second VRAM 58. The GPU 50 renders the created game image data in the VRAM 56, and the GPU 52 renders the created game image data in the VRAM 58.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

It is noted that a description is made that the LCD controller 60 is connected with the VRAM 56 and the VRAM 58 to fetch image data from these VRAM 56 and VRAM 58 in the above-described example. However, the image data rendered in the VRAM 56 and the VRAM 58 may be applied to the LCD controller 60 by the GPU 50 and the GPU 52 under control of the CPU core 42.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates data from the touch panel 22 is input to the CPU core 42 via the I/F circuit 54. In addition, the CPU core 42 reads the sound data necessary for the game such as a game music (BGM), a sound effect or voices of a game character (onomatopoeic sound), etc. from the RAM 48, and outputs it from the speaker 32 via the I/F circuit 54.

Figure 3:
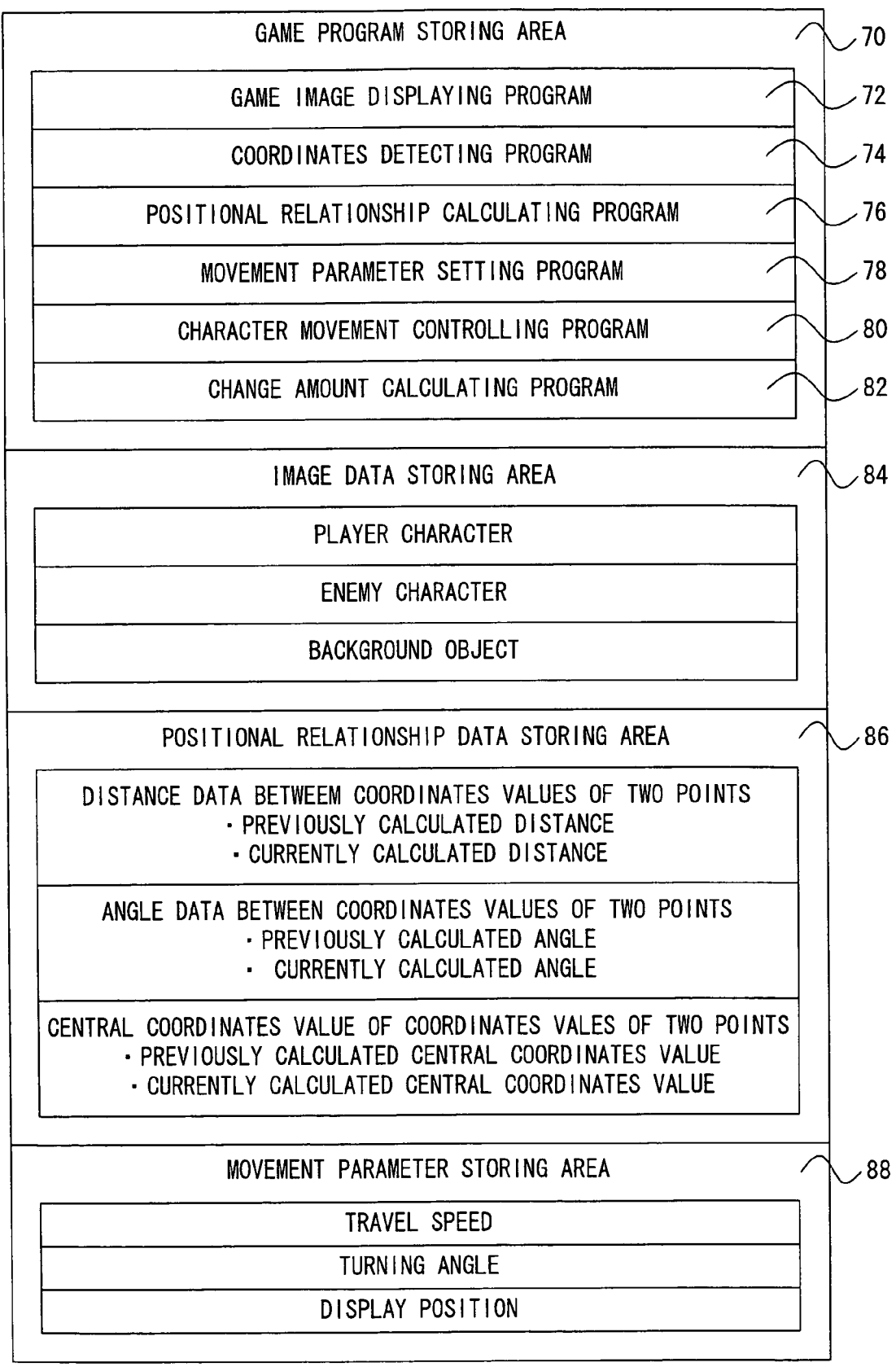
FIG. 3 is an illustrative view showing one example of a memory map of a RAM 48 shown in FIG. 2.

FIG. 3 is an illustrative view showing one example of a memory map of the RAM 48. The RAM 48 includes a game program storing area 70. A game program is loaded into the game program storing area 70 from the ROM 28a of the memory card 28. The game program of this embodiment includes a game image displaying program 72, a coordinates detecting program 74, a positional relationship calculating program 76, a movement parameter setting program 78, a character movement controlling program 80, a change amount calculating program 82, etc.

The game image displaying program 72 is a program for generating game image each to be displayed on the LCD 12 and the LCD 14 on the basis of image data, and so on to display them on the LCD 12 and the LCD14. According to this program, a game image including a game space including a player character is displayed on the LCD 12, for example.

The coordinates detecting program 74 is a program for detecting coordinates data input from the touch panel 22 in response to an operation of the touch panel 22 by the player. In a case that the player simultaneously points two points on the touch panel 22, for example, coordinates values of the two pointing positions are detected from the coordinates data.

Figure 4:
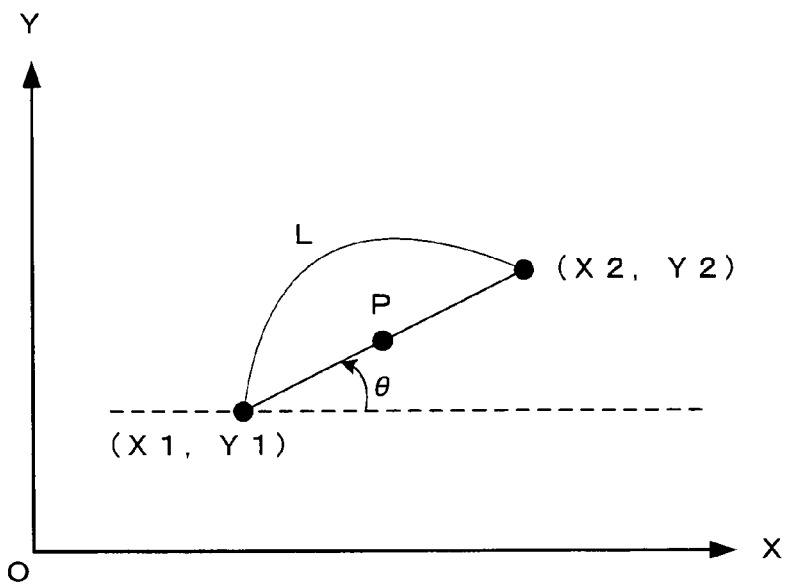
FIG. 4 is an illustrative view showing a distance between two points, an angle of the line connecting the two points, and a central coordinates value between the two points.

The positional relationship calculating program 76 is a program for calculating, in response to a simultaneous touch operation of the two points by the player, a positional relationship between the two points. Or, this may be a program for calculating a pointing state of the two points by the player. That is, according to this program, at least one of a distance between the two points pointed by the player and an angle of a line connecting the two points is calculated. Here, the angle of the line connecting the two points is an angle formed by the line connecting the pointed two points and a reference line (horizontal line, for example). Furthermore, as to the direction of the angle of the line connecting the two points, the left direction, that is, a counterclockwise direction, for example, is set to a plus direction. It is noted that the angle of the line connecting the two points may be referred to as an angle between the two points. When $(X1,Y1)$ and $(X2,Y2)$ are detected as the coordinates values of the two points, the distance L between the two points and an angle $\theta$ between the two points are calculated on the basis of equations (1) and (2) shown in FIG. 4. Furthermore, in this embodiment, according to this program, a central point of the pointed two points (central coordinates value) is also calculated. The coordinates value of the central point P between the two points is shown by an equation (3) as shown in FIG. 4. These distance, angle and central coordinates value, etc. between the two points are calculated every time a unit of time elapses, such as each frame or every predetermined number of frames.

The movement parameter setting program 78 is a program for setting a movement parameter of the player character. The movement parameter is a parameter set for controlling a movement of the player character, and the movement of the player character is determined on the basis of this movement parameter. The movement parameter includes a plurality of elements relating to movements. In this embodiment, a travel speed, a turning angle, etc are prepared as the movement parameter. For example, the movement parameter is set on the basis of at least one of the distance between the two points and the angle of the line connecting the two points. Specifically, out of the movement parameter of the player character, the travel speed is set on the basis of the distance between the two points, and the turning angle is set on the basis of the angle of the line connecting the two points. Furthermore, in this embodiment, a display position of the player character as the movement parameter of the player character is set on the basis of the central coordinates value between the two points.

On the basis of the movement parameter set by the movement parameter setting program 78, the character movement controlling program 80 to be described later controls the movement of the player character. Accordingly, the player can control the travel speed or the turning angle of the player character in correspondence with a distance or angle between the two points pointed by his two fingers 24, etc. Furthermore, the display position of the player character can be controlled on the basis of the central coordinates value between the two points.

Furthermore, the movement parameter setting program 78, when the distance and angle between the two points calculated by the above-described positional relationship calculating program 76 changes, changes the movement parameter on the basis of these change amounts. Specifically, the travel speed of the player character is changed on the basis of the change amount of the distance between the two points. For example, on the basis of the change amount of the distance, acceleration or deceleration of the travel speed is set. In a case the distance is changed to be increased, the acceleration of the travel speed is set, and in a case that distance is changed to be reduced, the deceleration of the travel speed is set. Furthermore, the turning angle of the player character is changed on the basis of the change amount of the angle between the two points. In addition, the display position of the player character is set on the basis of the central point currently calculated.

The character movement controlling program 80 described later controls the movement of the player character on the basis of the movement parameter changed by the movement parameter setting program 78. Accordingly, the player can change the travel speed or turning angle of the player character by changing the distance or angle between the two points.

The character movement controlling program 80 is a program for controlling the movement of the player character. The movement of the player character is controlled on the basis of the movement parameter. More specifically, the travel of the player character is controlled on the basis of the travel speed of the movement parameter set by the movement parameter setting program 78. Furthermore, the turn, rotation, or change of direction of the player character is controlled on the basis of the turning angle of the set movement parameter. In addition, the display position of the player character is controlled on the basis of the display position of the set movement parameter.

Also, in this program 80, when at least one of the distance and angle between the two points is changed, the movement of the player character is controlled on the basis of the movement parameter changed by the movement parameter setting program 78.

For example, a control depending on a value of the change amount of the distance is performed with respect to the travel of the player character. More specifically, it is determined whether or not the magnitude of the change of the distance between the two points is equal to or less than a first predetermined value L1. That is, it is determined whether or not the distance between the two points is changed so as to be reduced (minus change) and whether or not the change amount is equal to or more than the predetermined value. When the change amount of the distance is equal to or less than a first predetermined value L1, the travel of the player character is controlled such that a first special action relating to the travel is performed. On the other hand, when the change amount of the distance is not equal to or less than the first predetermined value L1, it is determined whether or not it is equal to or more than a second predetermined value L2. That is, it is determined whether or not the distance between two points is changed so as to be increased (plus change) and whether or not the magnitude of the change is equal to or more than the predetermined value. When the change amount of the distance is equal to or more than the second predetermined value L2, the travel of the player character is controlled such that a second special action relating to the travel is performed. On the other hand, when the change amount of the distance is not equal to or more than the second predetermined value L2, the travel of the player character is controlled on the basis of the set acceleration or deceleration of the travel speed. It is noted that the two threshold values for determining the change amount of the distance, that is, the first predetermined value L1 and the second predetermined value L2 are suitably set to have a relationship of L1<L2.

Furthermore, for example, with respect to the turn, rotation, or change of direction of the player character, control is performed depending on the value of the change amount of the angle. Specifically, it is determined whether or not the change amount between the two points is equal to or less than a first predetermined value $\theta 1$. That is, it is determined whether or not the angle between the two points is changed to the right (that is, clockwise), and whether or not the magnitude of the change is equal to or more than the predetermined value. When the change amount of the angle is equal to or less than the first predetermined value $\theta 1$, the turning of the player character is controlled such that a first special action relating to the turning is performed. On the other hand, when the change amount of the angle is not equal to or less than the first predetermined value $\theta 1$, it is determined whether or not it is equal to or more than a second predetermined value $\theta 2$. That is, it is determined whether or not the angle between the two points is changed to the left, and whether or not the magnitude of the change is equal to or more than the predetermined value. When the change amount of the angle is equal to or more than the second predetermined value $\theta 2$, the turning of the player character is controlled such that a second special action relating to the turning is performed. On the other hand, when the change amount of the angle is not equal to or more than the second predetermined value $\theta 2$, the turning of the player character is controlled on the basis of the changed turning angle. It is noted that the two threshold values for determining the change amount of the angle, that is, the first predetermined value $\theta 1$ and the second predetermined value $\theta 2$ are suitably set to have a relationship of $\theta 1 < \theta 2$.

As described above, according to this program 80, when the change amount is equal to or less than the predetermined value, or when the change amount is equal to or more than the predetermined value, the player character is allowed to perform the special action, capable of increasing interest of the game.

The change amount calculating program 82 is a program for calculating a change amount of the distance and a change amount of the angle when the distance and angle between the two points change. As described above, the character movement controlling program 80 changes the movement of the player character in correspondence with the change amount. The change amount is calculated every time a unit of time elapses, such as each frame or every predetermined number of frames. Accordingly, the change amount can be calculated each unit of time, and therefore, the movement of the player character can be changed every unit of time.

It is noted that the game program storing area 70, although illustration is omitted, stores various programs required to advance the game such as a program for generating and outputting game music or game sound.

Furthermore, the memory map of the RAM 48 includes a data storing area, and the data storing area stores data loaded from the ROM 28a or RAM 28b of the memory card 28, data generated in correspondence with the game processing, etc. The data storing area includes an image data storing area 84, a positional relationship data storing area 86, a movement parameter storing area 88, etc.

The image data storing area 84 stores image data for generating a game image. For example, the image data such as a player character, an enemy character, a background object, other objects, etc. is stored.

The positional relationship data storing area 86 stores data relating to a positional relationship or pointing state of the two points calculated by the positional relationship calculating program 76. Specifically, the area 86 stores distance data between the coordinates values of the two points. The data relating to the positional relationship or pointing state is calculated each unit of time, and therefore, the distance data calculated in a current process is stored, and the distance data that has been calculated in a previous process is also stored. Furthermore, the angle data between the coordinates values of the two points is stored. As to the angle data, the angle data that has been calculated in the previous process and the angle data calculated in the current process are stored. In addition, the central coordinates value data of the coordinates values of the two points is stored. As to the central point data, the central coordinates value that has been calculated in the previous process and the central coordinates value calculated in the current process are stored.

The movement parameter storing area 88 stores the movement parameter of the player character set by the movement parameter setting program 78. In this embodiment, the movement parameter such as a travel speed, a turning angle, a display position, etc. of the player character is stored.

It is noted that in the data storing area, although illustration is omitted, other game data generated in correspondence with the advance of the game (including a flag and a counter), etc. is stored.

Figure 5:
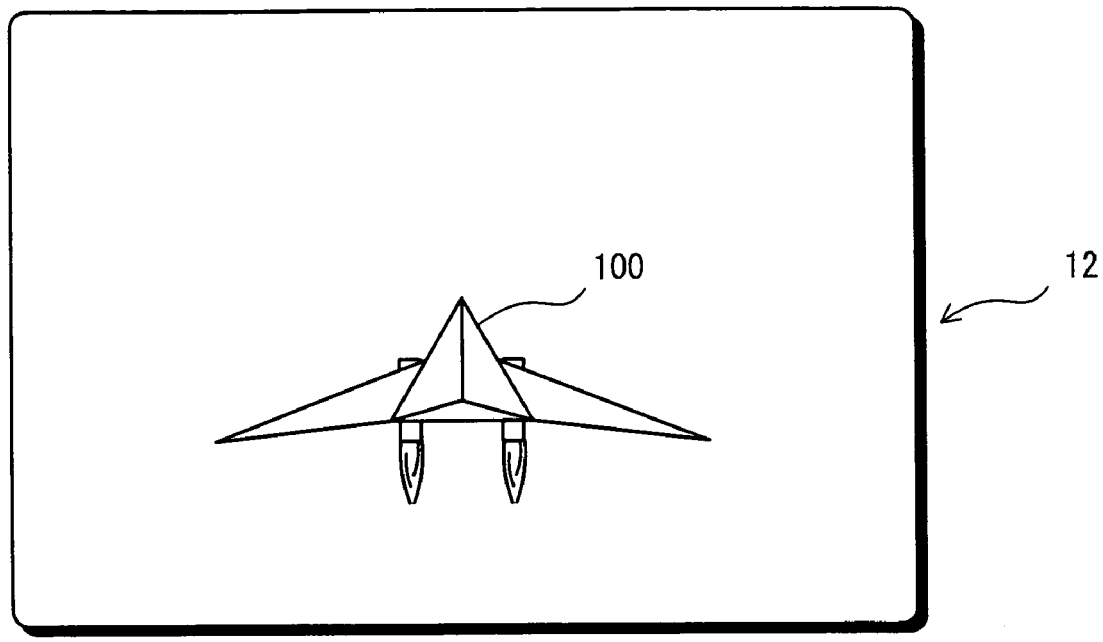
FIG. 5 is an illustrative view showing one example of an operating state by a player and a game image to be displayed on a first LCD.
Figure 5:
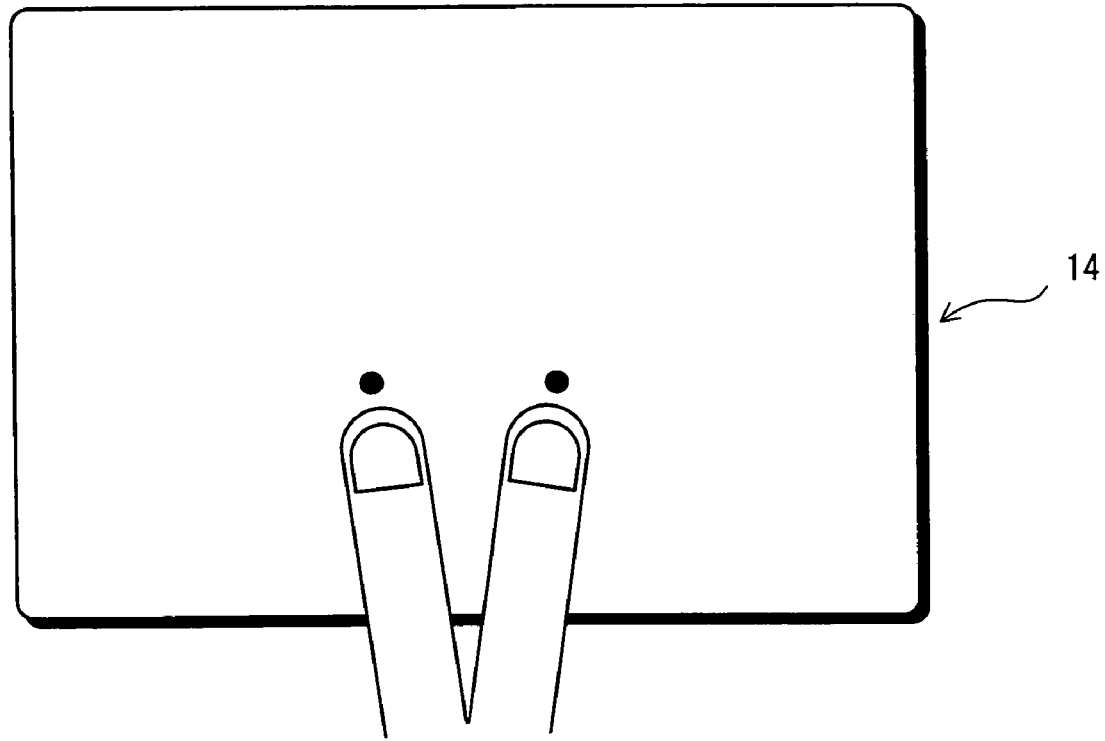

In this embodiment, a game space including a player character 100 is displayed on the LCD 12 as shown in FIG. 5. The player character 100 is a plane as one example, and displayed such that it flies toward a depth of the screen. The player operates the player character 100 by pointing the two points on the touch panel 22 provided on the LCD 14 with tips of his two fingers.

Specifically, the travel speed out of the movement parameter of the player character is set on the basis of the distance between the two pointing positions, and therefore, the travel of the player character 100 is controlled in correspondence with the distance between the two pointing positions. The travel of the player character 100 is represented by an amount of blast of the player character 100, a moving speed of the background from the front to the depth of the screen, etc. That is, in a case of a large amount of blast, or in a case of a high moving speed of the background, the travel speed of the player character 100 is enhanced.

Furthermore, the turning angle out of the movement parameter is set on the basis of the angle between the two pointing positions, and therefore, the turning of the player character 100 is controlled in correspondence with the angle between the two pointing positions. In this embodiment, both wings of the player character 100 are displayed so as to extend to a horizontal direction, and therefore, the horizontal line is set as a reference line. That is, a measure and direction of the turning angle are set on the basis of the measure and direction of the angle formed by the line connecting the two points and the horizontal line, and therefore, the turning or rotation of the player character 100 is controlled depending on the measure and direction of the angle between the two points. For example, if the line connecting the two points is parallel with the horizontal line, the both wings of the player character 100 are made horizontal.

In addition, the display position out of the movement parameter is set on the basis of the central point of the two pointing positions, and therefore, the display position of the player character 100 is controlled on the basis of the central coordinates value of the two pointing positions. For example, the player character 100 is displayed on a position of the LCD 12 corresponding to the central coordinates value of the two points.

Furthermore, in a case that operating state (pointing state) by the player is changed, the movement parameter of the player character 100 is changed on the basis of changes of the pointing state, and therefore, the player can operate the movement of the player character 100 by changing the two pointing positions as necessary.

Figure 6:
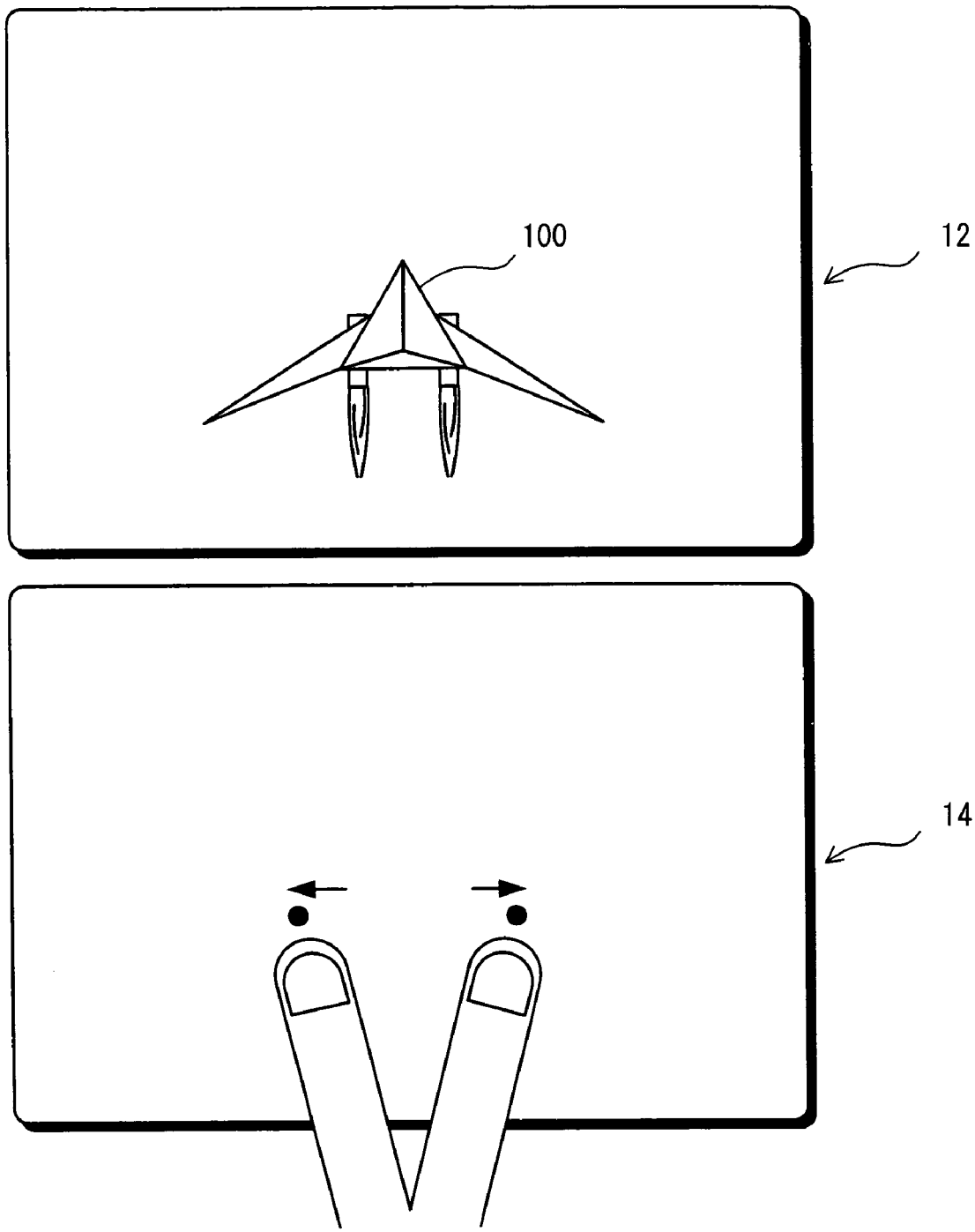
FIG. 6 is an illustrative view showing one example of an operating state in which the distance between the two points is increased from a state of FIG. 5 and a game image to be displayed on the first LCD.

Specifically, the travel of the player character is changed on the basis of the change amount of the distance between the two points. As shown in FIG. 6, when the distance between the two points is more increased than that in FIG. 5, the travel speed of the player character 100 is controlled so as to accelerate. For example, the acceleration for enhancing the travel speed of the movement parameter is set on the basis of the change amount of the distance, and on the basis of the acceleration, the travel of the player character 100 is controlled. A game image in which the player character 100 whose amount of blast is made large, or the moving speed of the background is enhanced, for example, is displayed on the LCD 12. Accordingly, when the player wants to move the player character 100 faster, he or she may operate the touch panel 22 so as to increase the distance between the two points.

Figure 7:
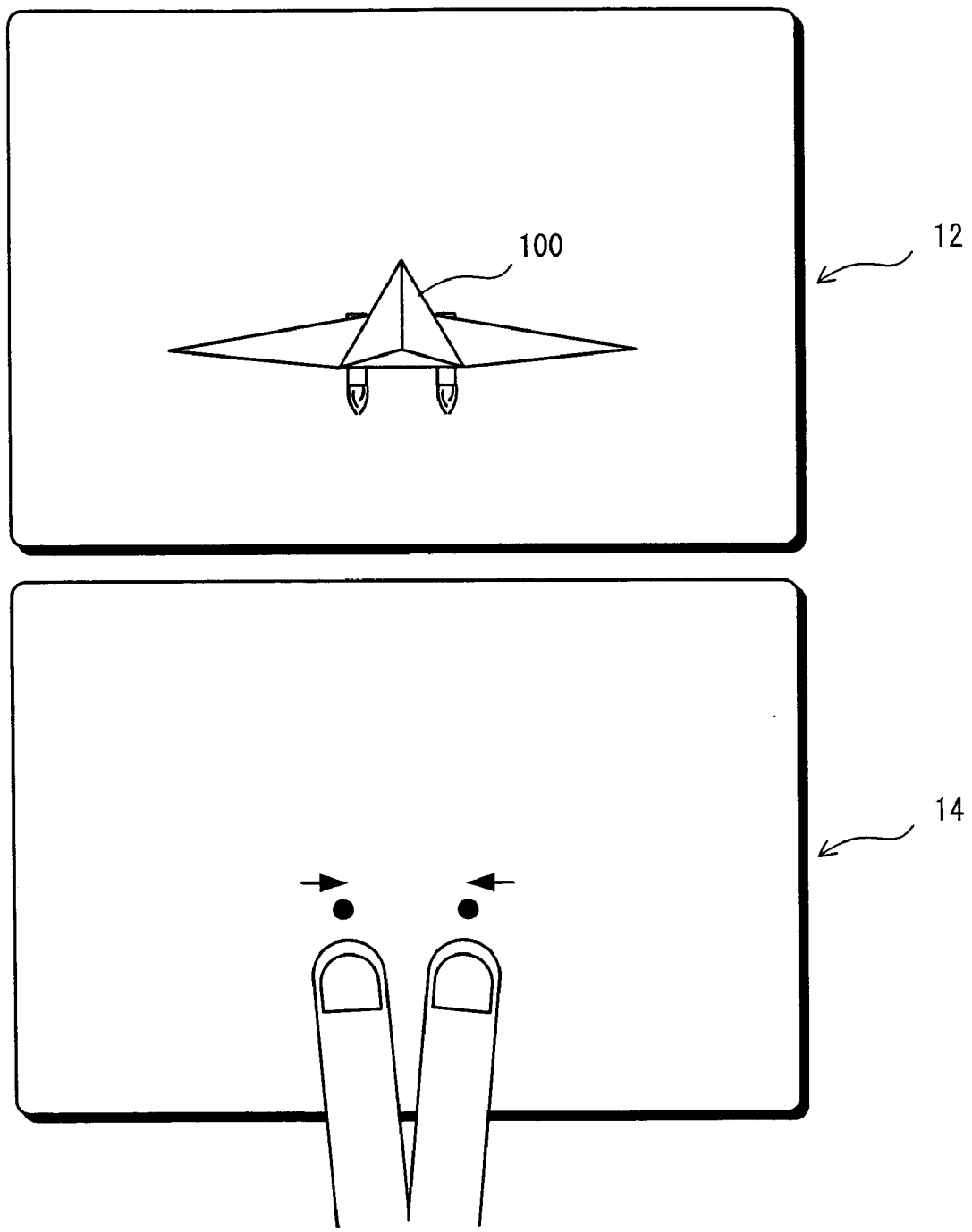
FIG. 7 is an illustrative view showing one example of an operating state in which the distance between the two points is reduced from the state of FIG. 5 and a game image to be displayed on the first LCD.

On the other hand, as shown in FIG. 7, when the distance between the two points is more reduced than that in FIG. 5, the travel speed of the player character 100 is controlled so as to decelerate. For example, the deceleration for lowering the travel speed of the movement parameter is set on the basis of the change amount of the distance, and on the basis of the deceleration, the travel of the player character 100 is controlled. A game image in which the player character 100 whose amount of blast is made small, or the moving speed of the background is lowered, for example, is displayed on the LCD 12. Accordingly, when the player wants to move the player character 100 slowly, he or she operates the touch panel 22 so as to reduce the distance between the two points.

Figure 8:
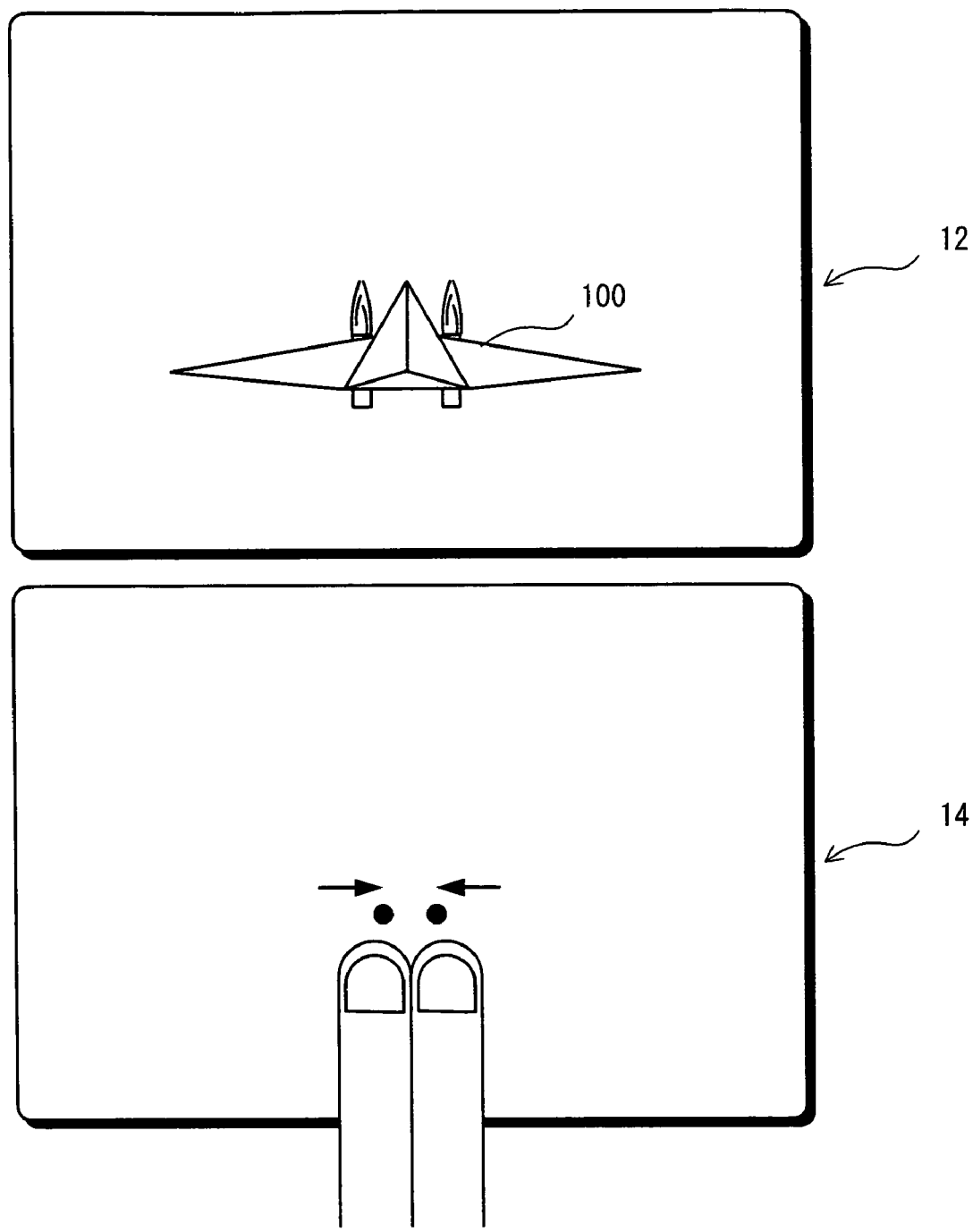
FIG. 8 is an illustrative view showing one example of an operating state in which a change amount of the distance between the two points is equal to or less than a first predetermined value and a game image to be displayed on the first LCD.

It is noted that in this embodiment, in a case that the distance between the two points is reduced such that the change amount of the distance is equal to or less than the first predetermined value L1, the player character 100 is controlled in travel so as to execute the first special action relating to the travel as shown in FIG. 8. A game image in which the player character 100 performs a reverse thrust action as a special action, for example is displayed on the LCD 12. Accordingly, when the player wants the player character 100 to suddenly decelerate, the distance between the two points may be operated so as to sharply be reduced (such that reduced amount of the distance per unit of time is equal to or less than the first predetermined value L1).

Figure 9:
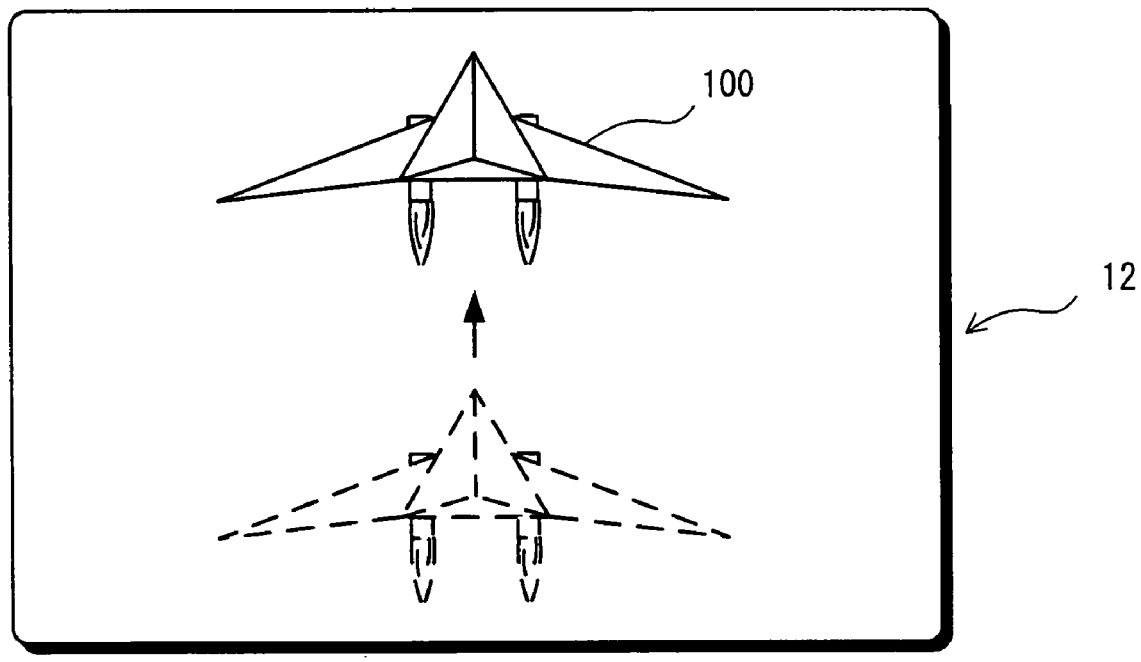
FIG. 9 is an illustrative view showing one example of an operating state in which a change amount of the distance between the two points is equal to or more than a second predetermined value and a game image to be displayed on the first LCD.
Figure 9:
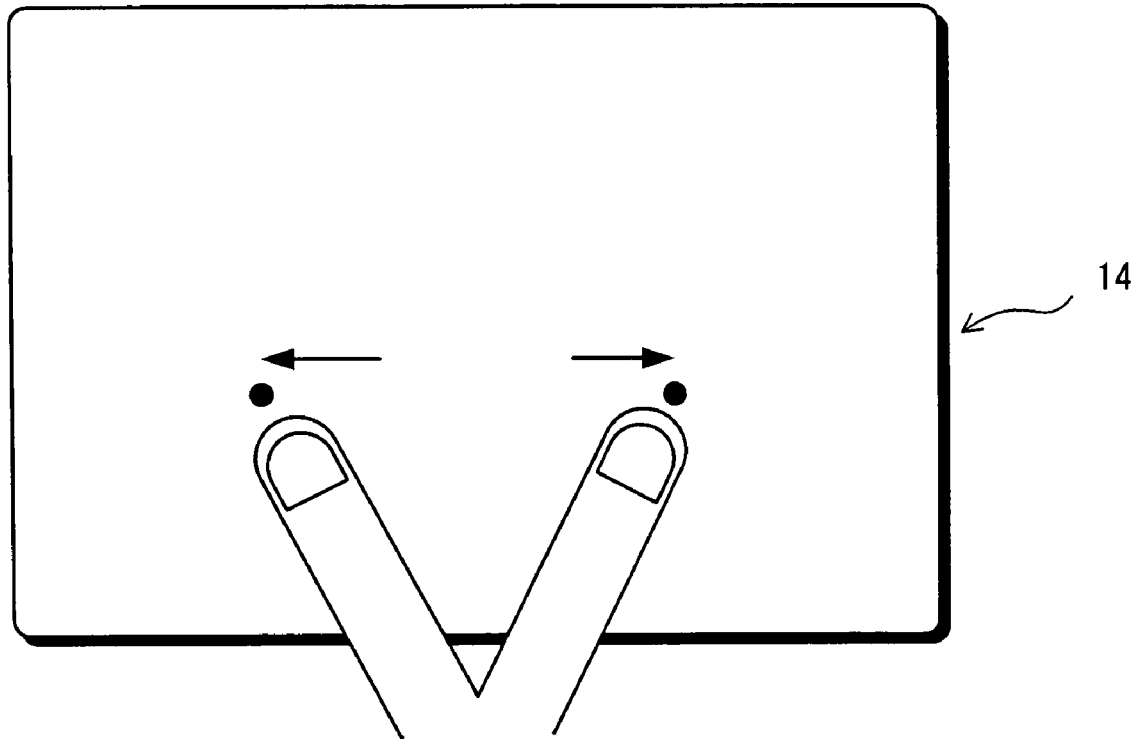

On the other hand, in a case that the distance between the two points is increased such that the change amount of the distance is equal to or more than the second predetermined value L2, the player character 100 is controlled in travel so as to execute the second special action relating to the travel as shown in FIG. 9. A game image in which the player character 100 performs a teleportation action as a special action, for example, is displayed on the LCD 12. Accordingly, when the player wants to teleport the player character 100, the distance between the two points may be operated so as to sharply be increased (such that increased amount of the distance per unit of time is equal to or more than the second predetermined value L2).

Figure 10:
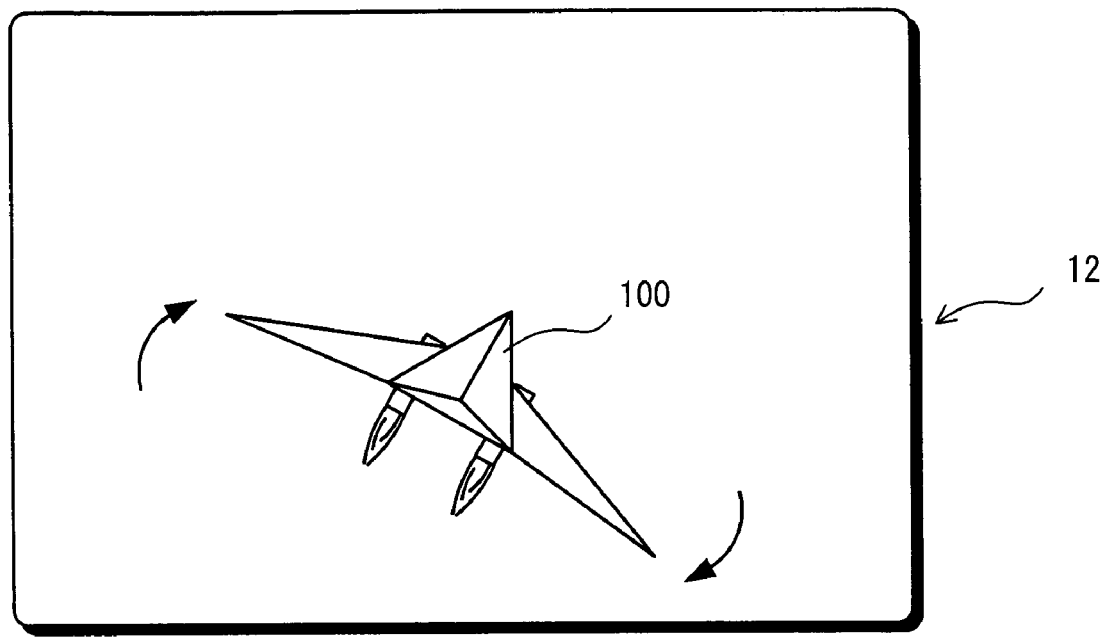
FIG. 10 is an illustrative view showing one example of an operating state in which an angle of the line connecting the two points is changed to the right from a state in FIG. 5 and a game image to be displayed on the first LCD.
Figure 10:
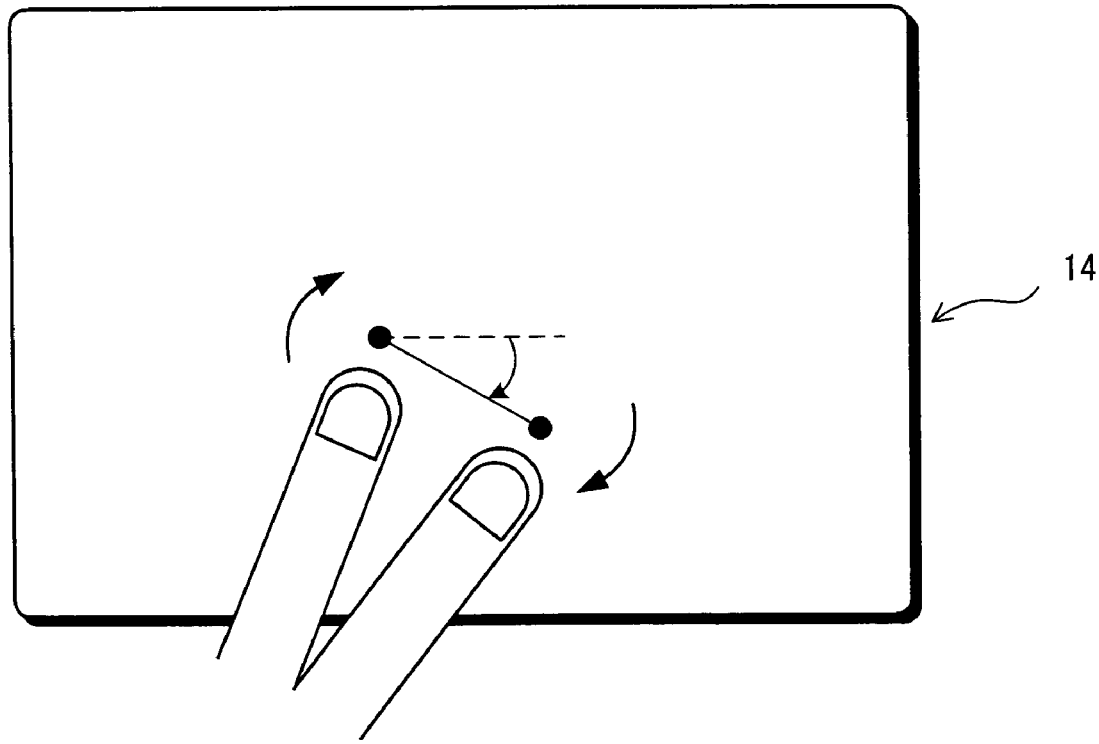

Furthermore, the turning angle of the player character 100 is changed in correspondence with the change amount of the angle between the two points. The direction of the turning is different depending on sign of the change amount of the angle. In this embodiment, since the left direction is set to be a plus direction as shown in FIG. 4, when the change amount of the angle is plus in sign, the turning direction is the left, while when the change amount of the angle is minus in sign, the turning direction is the right. For example, as shown in FIG. 10, when the change in angle is made to the right, that is, when the minus change is made, the player character 100 is turned to the right. Furthermore, an absolute value of the turning angle of the player character 100 is set on the basis of the absolute value of the change amount of the angle of the two points. It is noted that although illustration is omitted, when the change in angle is made to the left, that is, when the plus change is made, the player character 100 is turned to the left.

Figure 11:
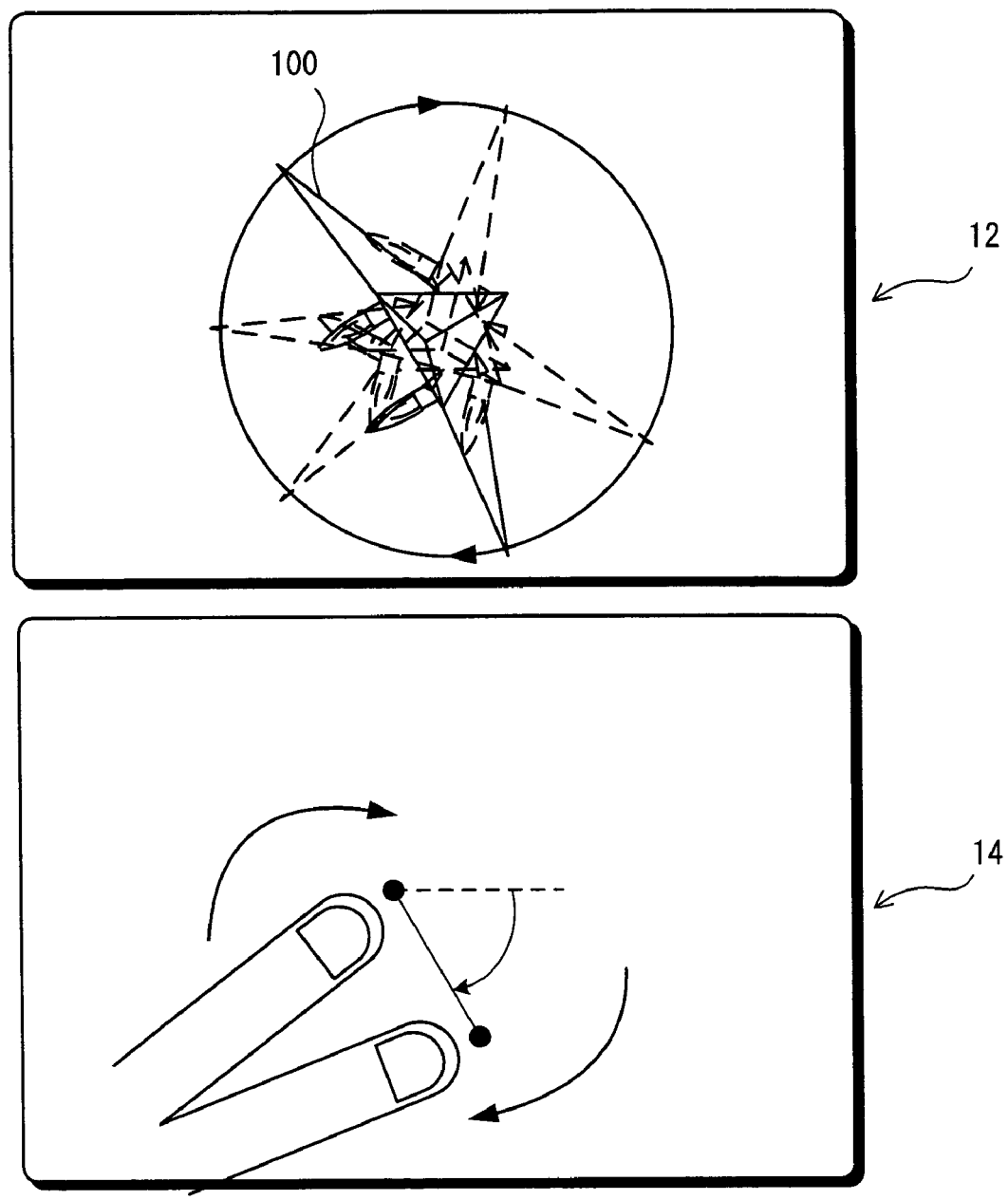
FIG. 11 is an illustrative view showing one example of an operating state in which the change amount of the angle of the line connecting the two points is equal to or less than a first predetermined value and a game image to be displayed on the first LCD.

It is noted that in this embodiment, when the change amount of the angle is equal to or less than the first predetermined value θ1, that is, when the angle is changed equal to or more than a predetermined measure (magnitude) to the right, the player character 100 is controlled in turning so as to execute the first special action relating to the turning as shown in FIG. 11. A game image in which the player character 100 performs a right spin action as a special action is displayed on the LCD 12. Accordingly, when the player wants the player character 100 to perform the special action to the right, an operation is simply performed such that the angle between the two points is suddenly changed in a clockwise direction.

Figure 12:
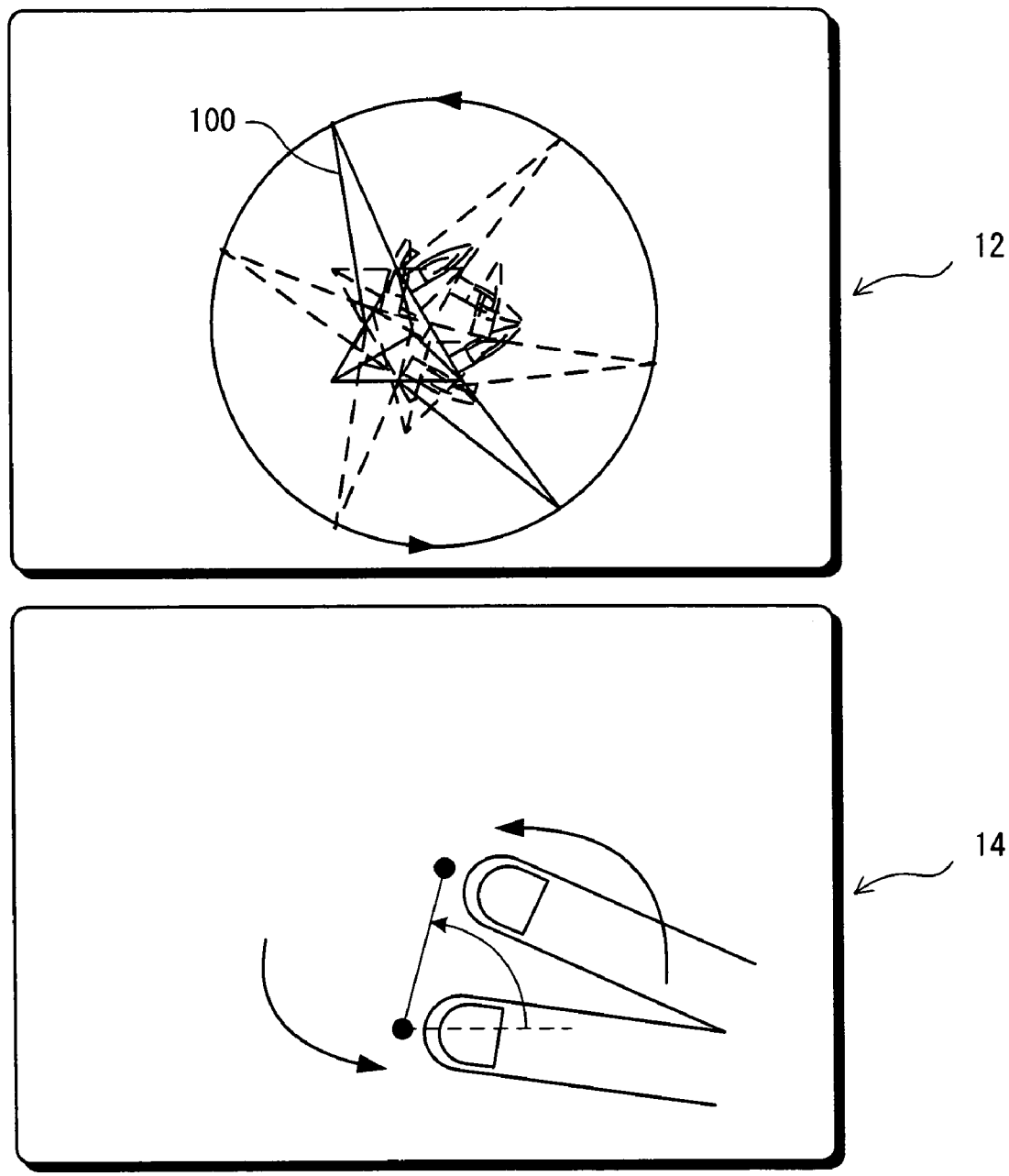
FIG. 12 is an illustrative view showing one example of an operating state in which the change amount of the angle of the line connecting the two points is equal to or more than a second predetermined value and a game image to be displayed on the first LCD.

On the other hand, when the change amount of the angle is equal to or more than the second predetermined value θ2, that is, when the angle is changed equal to or more than a predetermined measure (magnitude) to the left, the player character 100 is controlled in turning so as to execute the second special action relating to the turning as shown in FIG. 12. A game image in which the player character 100 performs a left spin action as a special action is displayed on the LCD 12. Accordingly, when the player wants the player character 100 to perform the special action to the left, an operation is simply performed such that the angle between the two points is suddenly changed in the counterclockwise direction.

Figure 13:
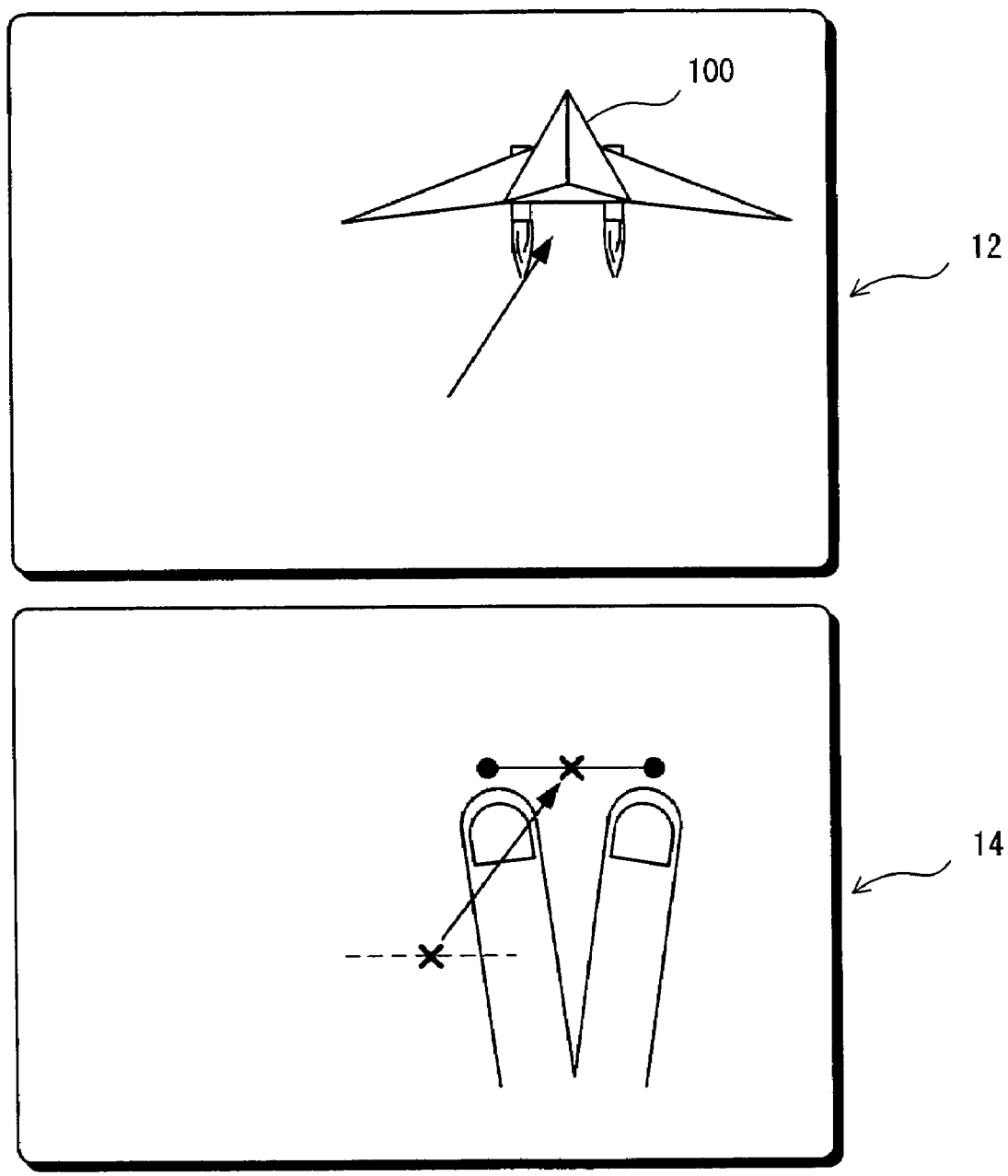
FIG. 13 is an illustrative view showing one example of an operating state in which a central point of the two points is changed from a state in FIG. 5 and a game image to be displayed on the first LCD.

Furthermore, the display position of the player character 100 is changed in correspondence with changes of the central coordinates value between the two points. That is, as shown in FIG. 13, for example, when the central coordinates value between the two points is changed, the player character 100 is displayed at a position corresponding to a changed central coordinates value.

Figure 14:
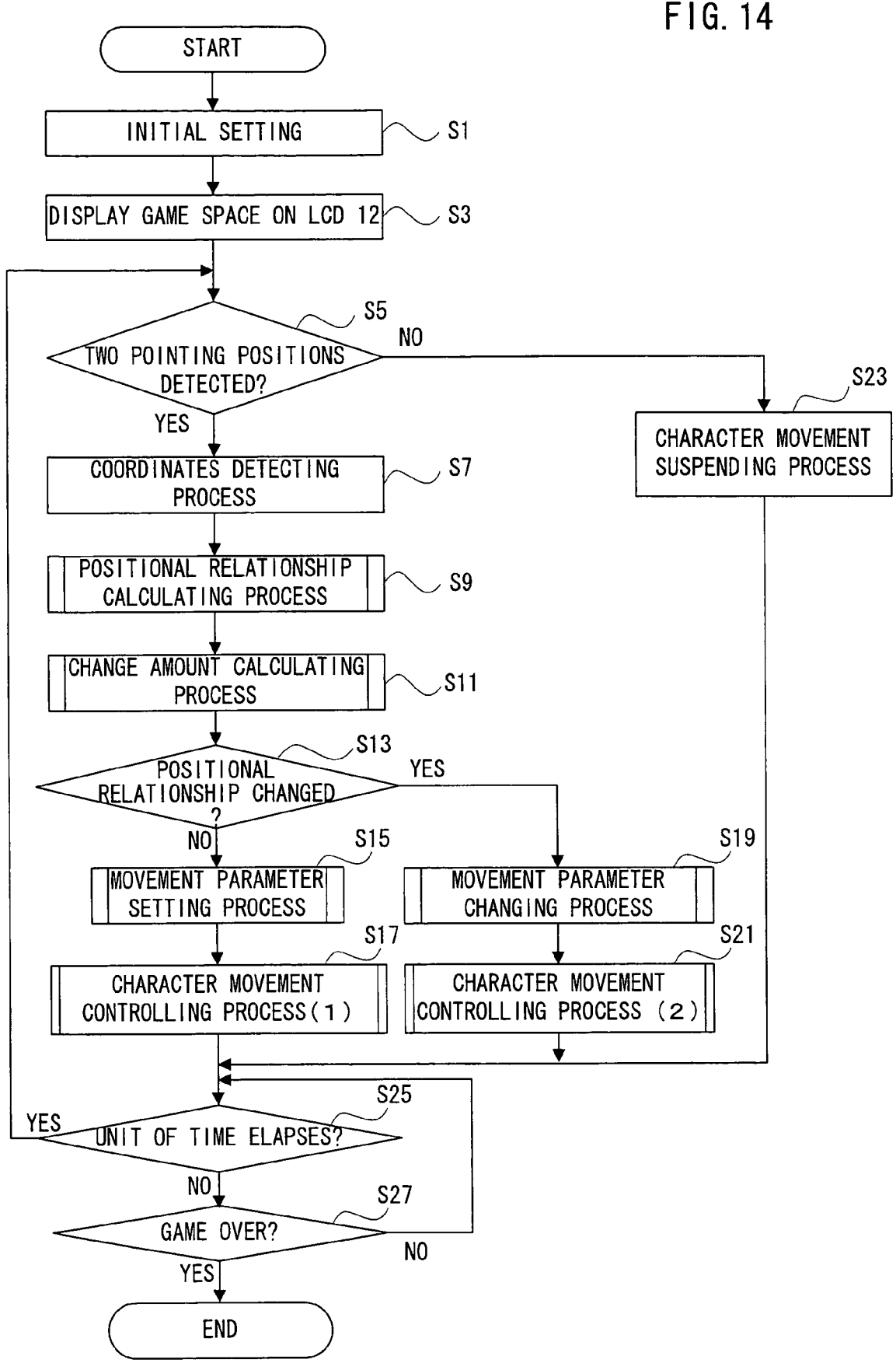
FIG. 14 is a flowchart showing one example of a game operation of a game apparatus in FIG. 1 embodiment.

FIG. 14 shows one example of a game operation of the game apparatus 10. At a start of the game, the CPU core 42 first executes an initial setting to set default values to various variables and flags in a step S1.

Next, in a step S3, the CPU core 42 displays a game image representing a game space on the LCD 12. For example, the CPU core 42 generates a game image of a game space on the basis of the game image displaying program 72 and the image data stored in the image data storing area 84 by use of the GPU 50, and displays the game image on the LCD 12 by use of the LCD controller 60.

In a step S5, the CPU core 42 determines whether or not the two pointing positions are detected on the basis of coordinates data input from the touch panel 22. If "YES" in the step S5, that is, if the coordinates data includes coordinates values of the two points, the CPU core 42 performs a coordinates detecting process to detect the coordinates values of the two pointing positions in a step S7.

Figure 15:
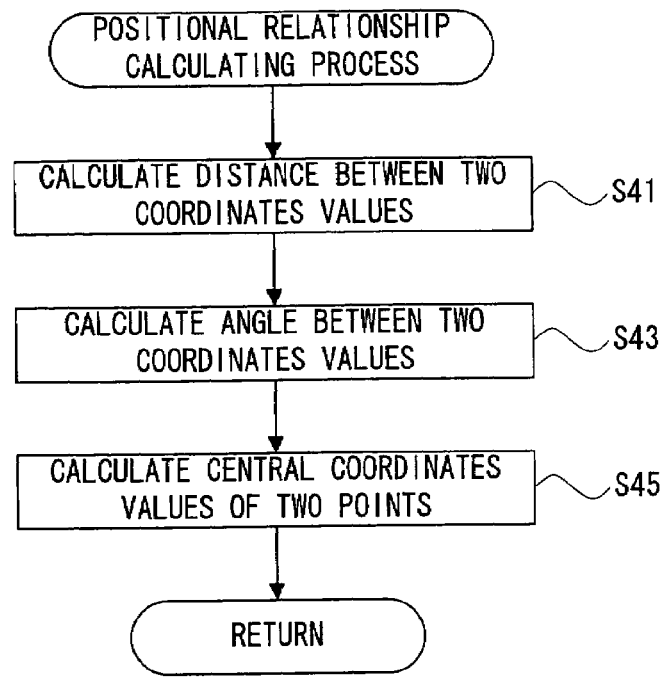
FIG. 15 is a flowchart showing one example of an operation of a positional relationship calculating process in FIG. 14.

Succeedingly, in a step S9, the CPU core 42 executes a positional relationship calculating process on the basis of the detected coordinates values of the two points. The operation of the positional relationship calculating process is shown in detail in FIG. 15. In a first step S41 in FIG. 15, the CPU core 42 calculates a distance between the coordinates values of the two points. The calculated distance between the two points is stored as distance data currently calculated in the positional relationship data storing area 86. It is noted that the distance data that has bee calculated in the previous process is stored as the distance data previously calculated in the area 86. Next, in a step S43, the CPU core 42 calculates an angle between the coordinates values of the two points, and stores it as angle data currently calculated in the positional relationship data storing area 86. It is noted that the angle data that has been calculated in the previous process is stored as the angle data previously calculated in the area 86. Succeedingly, in a step S45, the CPU core 42 calculates a central coordinates value between the coordinates values of the two points, and stores it as central coordinates value data currently calculated in the positional relationship data storing area 86. It is noted that the central coordinates value data that has been calculated in the previous process is stored as the central coordinates value data previously calculated in the area 86. After completion of the positional relationship calculating process, the process returns to a step S11 shown in FIG. 14.

Figure 16:
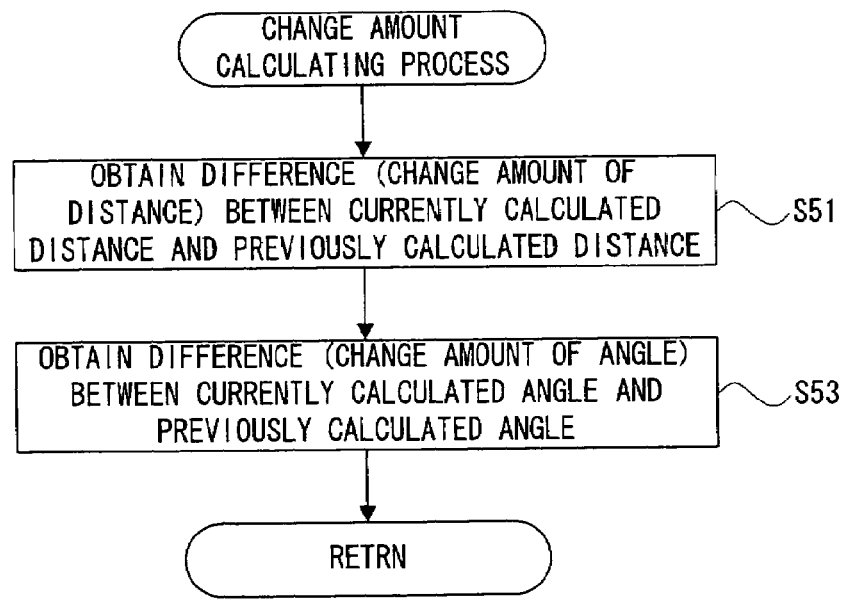
FIG. 16 is a flowchart showing one example of an operation of a change amount calculating process in FIG. 14.

In the step S11 in FIG. 14, the CPU core 42 executes a change amount calculating process. The operation of the change amount calculating process is shown in detail in FIG. 16. In a first step S51 in FIG. 16, the CPU core 42 calculates a difference between the distance currently calculated and the distance previously calculated, that is, a change amount of the distance on the basis of the distance data between the two points stored in the positional relationship data storing area 86. Next, in a step S53, the CPU core 42 calculates a difference between the angle currently calculated and the angle previously calculated, that is, a change amount of the angle on the basis of the angle data between the two points stored in the positional relationship data storing area 86. After completion of the change amount calculating process, the process returns to a step S13 in FIG. 14.

In the step S13 in FIG. 14, the CPU core 42 determines whether or not the positional relationship of the two points or the pointing state is changed. For example, it is determined whether or not the distance or angle between the two points is changed on the basis of the distance change amount or angle change amount calculated in the step S11. If "NO" in the step S13, that is, if the distance and angle between the two points is not changed between the current process and the previous process, the CPU core 42 executes a movement parameter setting process in a step S15. An operation of the movement parameter setting process is shown in FIG. 17 in detail.

Figure 17:
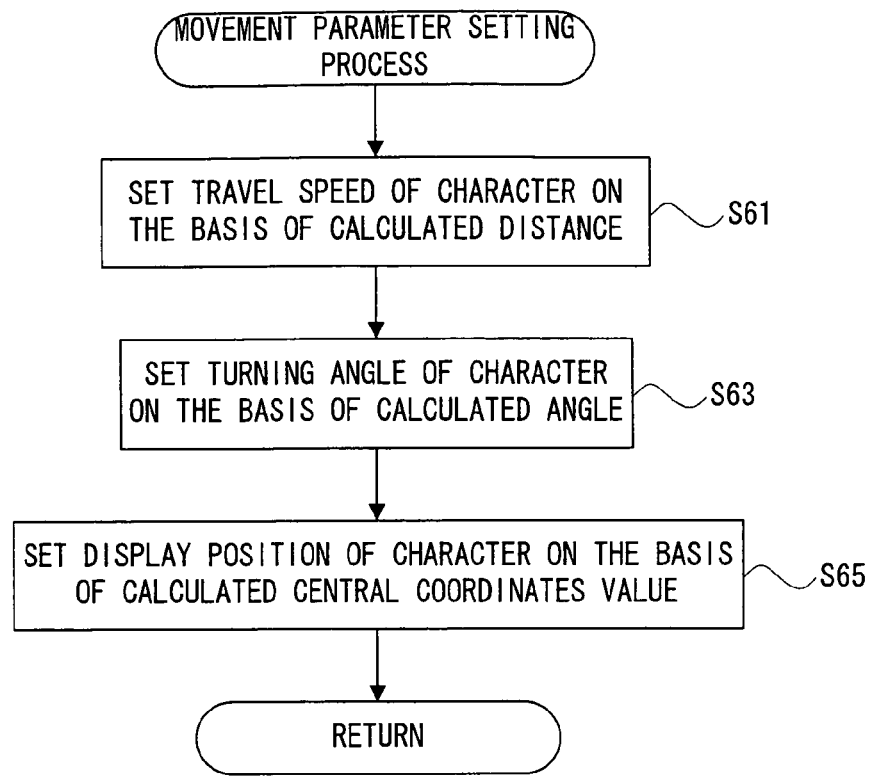
FIG. 17 is a flowchart showing one example of an operation of a movement parameter setting process in FIG. 14.

In a first process in a step S61 in FIG. 17, the CPU core 42 sets a travel speed as the movement parameter of the player character 100 on the basis of the currently calculated distance between the two points stored in the positional relationship data storing area 86. The travel speed is set in proportion to the distance between the two points, for example. The set travel speed is stored in an area for the travel speed data in the movement parameter storing area 88.

Next, in a step S63, the CPU core 42 sets a turning angle as the movement parameter of the player character 100 on the basis of the currently calculated angle between the two points stored in the storing area 86. For example, a direction of the turning angle is set on the basis of the sign (direction) of the angle between the two points, and a measure of the turning angle is set in proportion to the measure of the angle between the two points. The set turning angle is stored in an area for turning angle data in the movement parameter storing area 88.

Succeedingly, in a step S65, the CPU core 42 sets the display position as the movement parameter of the player character 100 on the basis of the currently calculated central coordinates value between the two points stored in the storing area 86. The display position is set at a position on the LCD 12 corresponding to the central coordinates value between the two points (the same position, for example). The set display position is stored in an area for display position data in the movement parameter storing area 88. After completion of the movement parameter setting process, the process returns to a step S17 shown in FIG. 14.

Figure 18:
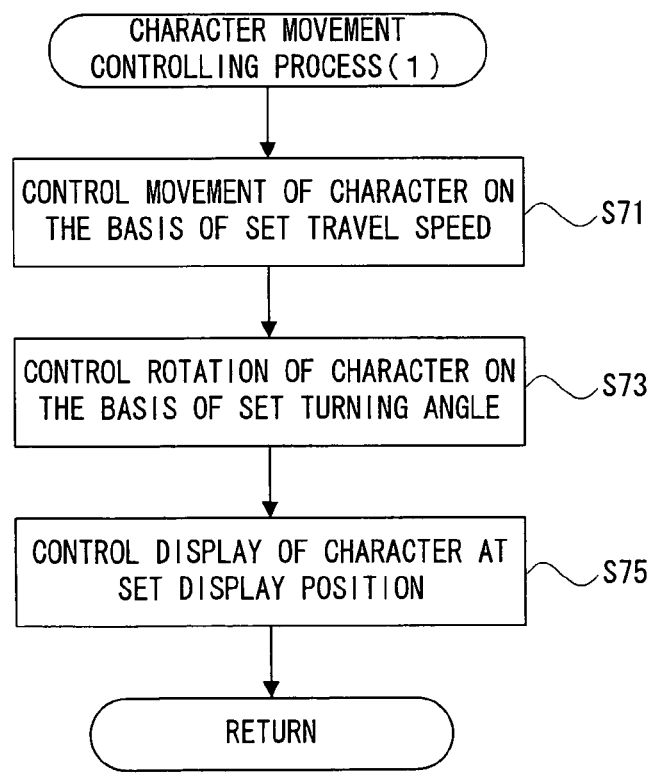
FIG. 18 is a flowchart showing one example of an operation of a character movement controlling process (1) in FIG. 14.

In the step S17 in FIG. 14, the CPU core 42 executes a character movement controlling process (1). An operation of the character movement controlling process (1) is shown in FIG. 18 in detail. In a first step S71 in FIG. 18, the CPU core 42 controls the travel of the player character 100 on the basis of the travel speed set and stored in the movement parameter storing area 88. Next, in a step S73, the CPU core 42 controls a rotation or turning of the player character 100 on the basis of the turning angle set and stored in the storing area 88. Then, in a step S75, the CPU core 42 controls a display of the player character 100 on the basis of the display position set and stored in the storing area 88. Thus, as shown in FIG. 5, for example, a game image in which the movement of the player character 100 is controlled in correspondence with the pointing state of the two points by the player is generated and displayed on the LCD 12. After completion of the character movement controlling process (1), the process returns to a step S25 in FIG. 14.

Figure 19:
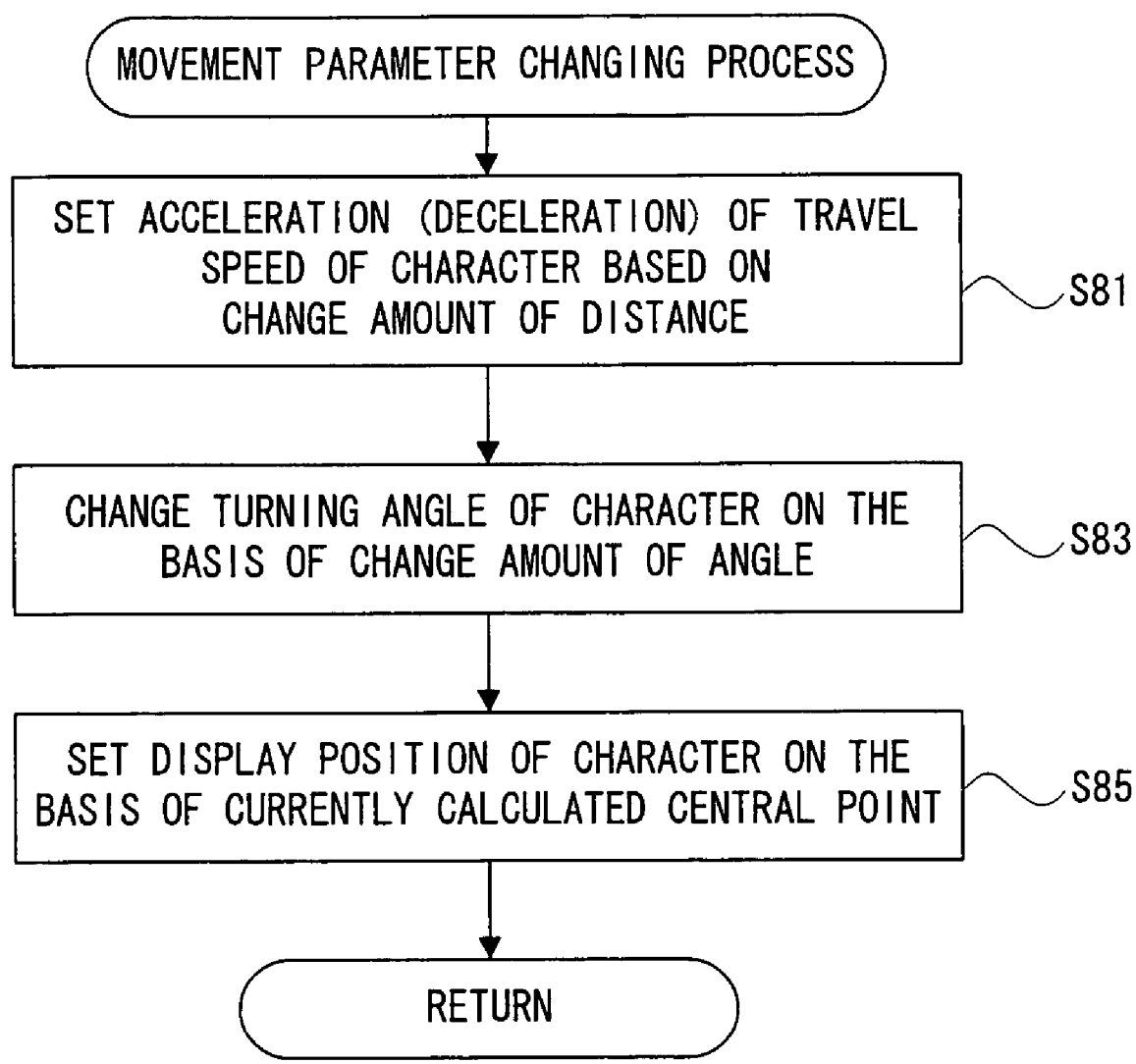
FIG. 19 is a flowchart showing one example of an operation of a movement parameter changing process in FIG. 14.

On the other hand, if "YES" in the step S13, that is, if the distance and angle between the two points are changed between the current process and the previous process, the CPU core 42 executes a movement parameter changing process in a step S19. An operation of the movement parameter changing process is shown in FIG. 19 in detail. In a first process in a step S81 shown in FIG. 19, the CPU core 42 sets acceleration or deceleration of the travel speed as the movement parameter of the player character 100 on the basis of the distance change amount calculated in the change amount calculating process in the step S11 (FIG. 14). Specifically, where the change amount of the distance is plus in sign, the acceleration is set while where it is minus in sign, the deceleration is set. Furthermore, the magnitude of the acceleration or deceleration is set in proportion to an absolute value of the distance change amount, for example. In addition, the travel speed set on the basis of the set acceleration or deceleration is stored in the movement parameter storing area 88.

Next, in a step S83, the CPU core 42 changes the turning angle as the movement parameter of the player character 100 on the basis of the change amount of the angle calculated in the process in the step S11. The turning angle is changed in proportion to the change amount of the angle, for example. Furthermore, the changed turning angle is stored in the movement parameter storing area 88.

Succeedingly, in a step S85, the CPU core 42 sets the display position as the movement parameter of the player character 100 on the basis of the currently calculated central point (central coordinates value) stored in the positional relationship data storing area 86. The display position is set to a coordinates value on the LCD 12 corresponding to the coordinates value of the currently calculated central position, for example. Furthermore, the set display position is stored in the movement parameter storing area 88. After completion of the movement parameter changing process, the process returns to a step S21 in FIG. 14.

Figure 20:
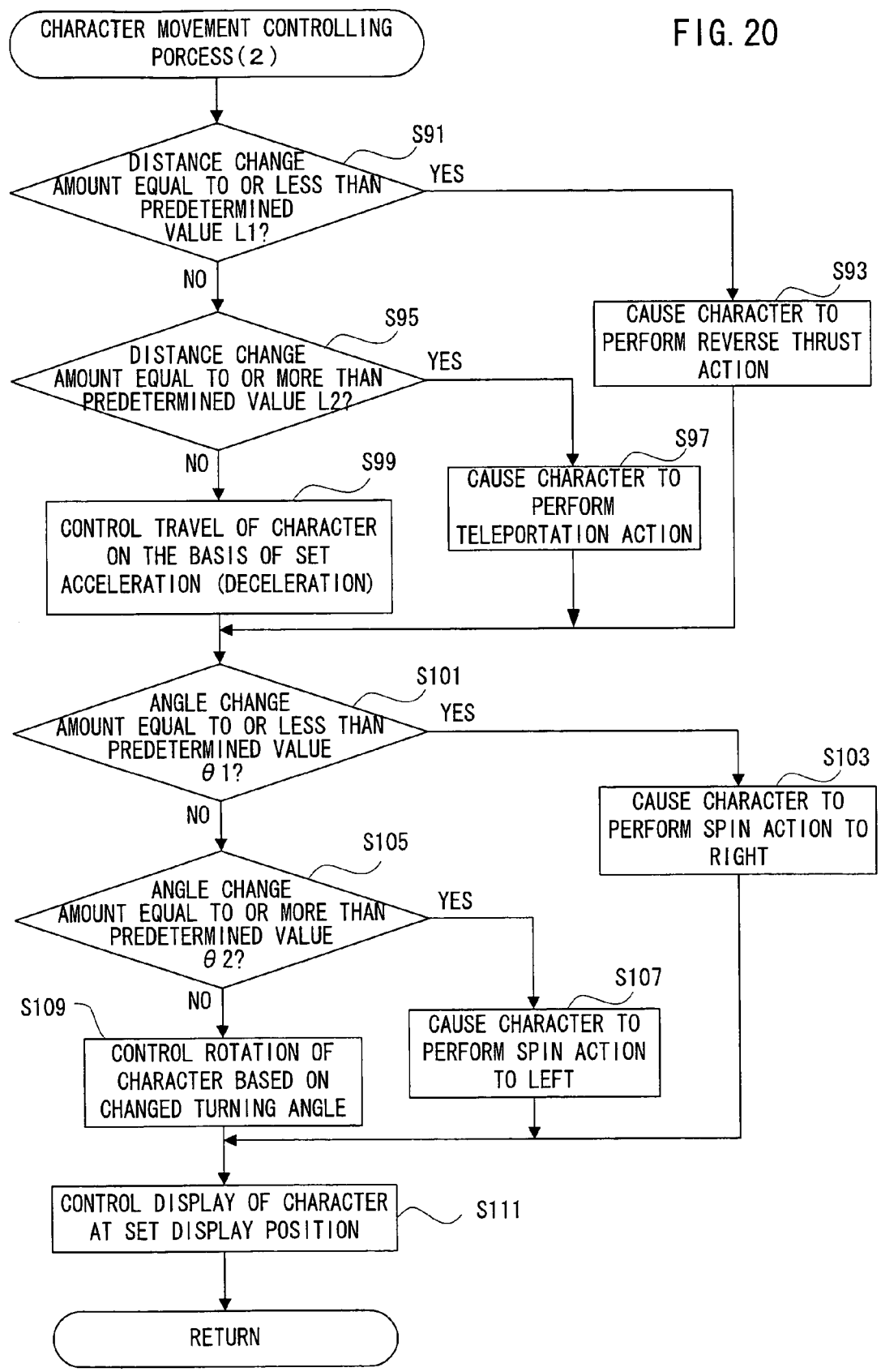
FIG. 20 is a flowchart showing one example of an operation of a character movement controlling process (2) in FIG. 14.

In the step S21 in FIG. 14, the CPU core 42 executes a character movement controlling process (2). An operation of the character movement controlling process (2) is shown in FIG. 20 in detail. In steps S91-S99 in FIG. 20, the travel of the player character 100 is controlled on the basis of the change amount of the distance, in steps S101-S109, the rotation of the player character 100 is controlled on the basis of the change amount of the angle, and in a step S111, the display of the player character 100 is controlled.

In the first step S91 in FIG. 20, the CPU core 42 determines whether or not the change amount of the distance calculated in the change amount calculating process in the step S11 (FIG. 14) is equal to or less than the first predetermined value L1. If "YES" is determined, the CPU core 42 causes the player character 100 to perform a reverse thrust action (first special action relating to the travel), for example, in the step S93. In this case, a game image in which the player character 100 suddenly brakes by putting the engines into reverse is displayed as shown in FIG. 8.

On the other hand, if "NO" in the step S91, the CPU core 42 determines whether or not the change amount of the distance is equal to or more than the second predetermined value L2 in the step S95. If "YES" is determined, the CPU core 42 causes the player character 100 to perform a teleportation action (second special action relating to the travel) in the step S97. In this case, a game image in which the player character 100 is instantaneously moved to another place is displayed as shown in FIG. 9, for example.

On the other hand, if "NO" in the step S95, the CPU core 42 controls the travel of the player character 100 on the basis of the acceleration or deceleration set in the movement parameter changing process (FIG. 19) in the step S99. In this case, when the acceleration is set, a game image in which the player character 100 accelerates with a blast amount increased in correspondence with the acceleration is displayed as shown in FIG. 6, for example. When the deceleration is set, a game image in which the player character 100 decelerates with a blast amount reduced in correspondence with the deceleration is displayed as shown in FIG. 7, for example.

Succeedingly, in the step S101, the CPU core 42 determines whether or not the change amount of the angle calculated in the step S11(FIG. 14) is equal to or less than the first predetermined value θ1. If "YES" is determined, the CPU core 42 causes the player character 100 to perform the spin action to the right (first special action relating to turning), for example, in a step S103. In this case, a game image in which the player character 100 swiftly rotates to the right is displayed as shown in FIG. 11, for example.

On the other hand, if "NO" in the step S101, the CPU core 42 determines whether or not the change amount of the angle is equal to or more than the second predetermined value θ2 in the step S105. If "YES" is determined, the CPU core 42 causes the player character 100 to perform the spin action to the left (second special action relating to turning), for example, in the step S107. In this case, a game image in which the player character 100 swiftly rotates to the left is displayed as shown in FIG. 12, for example.

On the other hand, if "NO" in the step S105, the CPU core 42 controls the rotation of the player character 100 on the basis of the turning angle changed in the movement parameter changing process (FIG. 19) in the step S109. In this case, a game image in which the player character 100 is turned in correspondence with the change amount of the angle is displayed as shown in FIG. 10, for example.

Succeedingly, in the step S111, the CPU core 42 controls the display of the player character 100 at the display position set by the movement parameter changing process (FIG. 19). Accordingly, a game image in which the above-described movement of travel or rotation of the player character 100 is performed at the set display position is displayed. After completion of the character movement controlling process (2), the process returns to a step S25 in FIG. 14.

If "NO" in the step S5, that is, if the coordinates values of the two points are not included in the coordinates data from the touch panel 22, the CPU core 42 executes a movement suspending process of the player character 100 in a step S23. In this case, regarding that the player does not operate the player character 100, the movement of the player character 100 is suspended. After completion of the step S23, the process proceeds to the step S25.

In the step S25, the CPU core 42 determines whether or not a unit of time elapses, and if "YES", the process returns to the step S5. Thus, in this embodiment, processes such as the detection of the coordinates values of the two points, the calculation of the positional relationship, the calculation of the change amount, the setting of the movement parameter, the movement control of the character, etc. are repeatedly executed each unit of time, whereby, the movement of the player character 100 can be controlled in response to a simultaneous operation of the two points on the touch panel 22.

On the other hand, if "NO" in the step S25, the CPU core 42 determines whether game end or not. If "NO" in the step S27, the process returns to the step S25, while if "YES", the game processing is ended.

According to this embodiment, the movement parameter of the player character 100 such as the travel speed, turning angle, etc. is set on the basis of a distance between the two pointing points and an angle of the line connecting the two points through the operation of the touch panel 22 by the player, and therefore, a movement of the player character 100 such as travel and turning can be controlled in correspondence with the distance between the two points and the angle of the line connecting the two points.

Furthermore, change amounts of the distance and angle between the two points are calculated, and on the basis of the calcualted change amounts, the movement parameter of the player character 100 such as the travel speed, turning angle, etc. is changed, and therefore, it is possible to change a movement of the player character 100 such as travel and turning in correspondence with changes in distance between the two points and in angle of the line connecting the two points.

Figure 21:
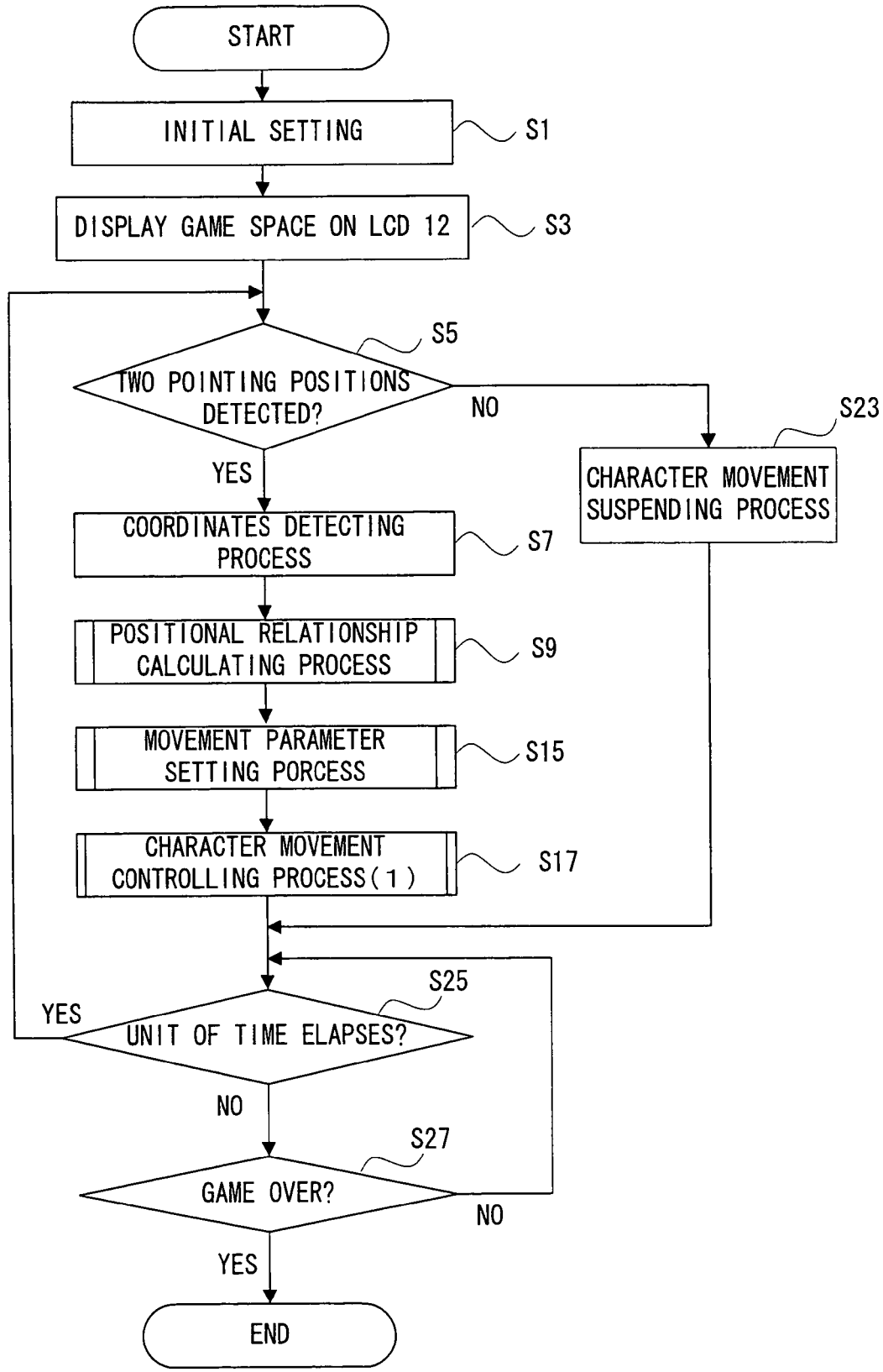
FIG. 21 is a flowchart showing a modified example of an operation of a game operation of a game apparatus in FIG. 1 embodiment.

It is noted that in the above-described embodiment, in a case that the distance and angle between the two points are changed, the movement of the player character 100 is controlled in correspondence with the distance change amount and the angle change amount. However, in another embodiment as shown in FIG. 21, the movement of the player character 100 may be controlled in correspondence with the distance and angle between the two points calculated in the current process itself independent of the change amount. It is noted that the process in each step of the flowchart in FIG. 21 is the same as a corresponding step shown in FIG. 14 flowchart, and therefore, a description of the operation of FIG. 21 flowchart is omitted by applying the same symbol.

Figure 22:
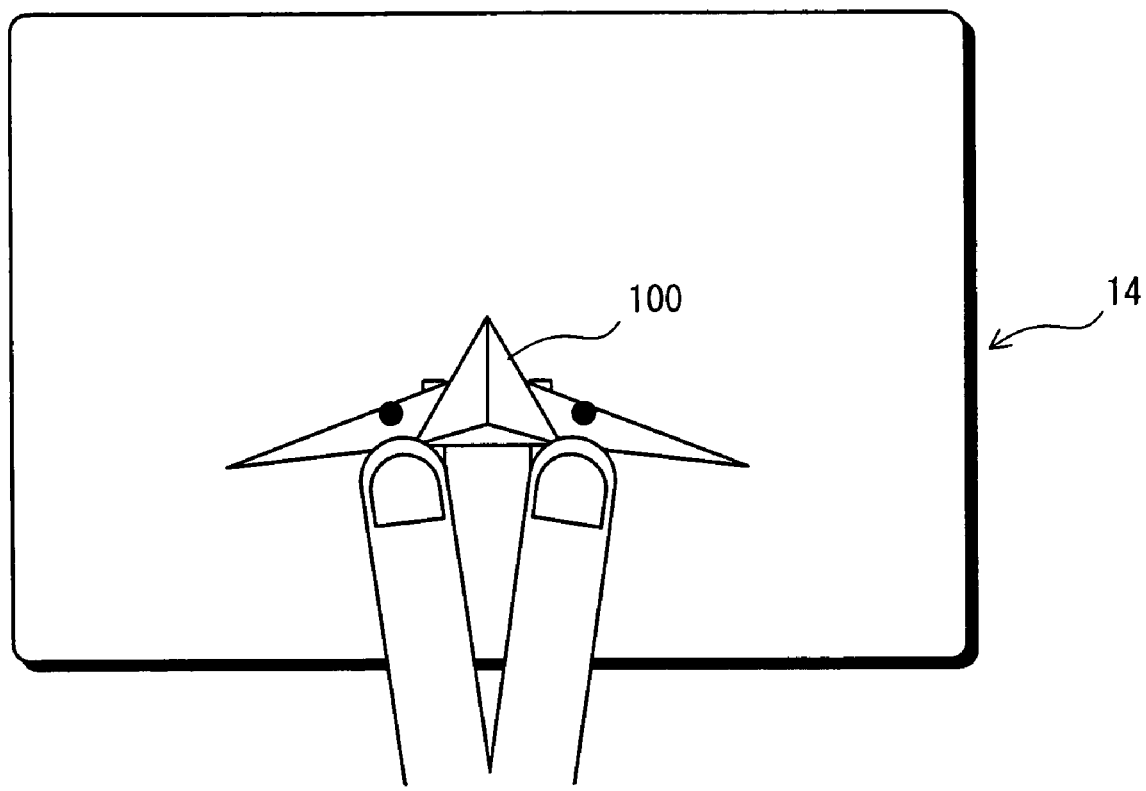
FIG. 22 is an illustrative view showing one example of a game image and an operating state by a player in a case that a character is displayed on a second LCD provided with a touch panel.

In addition, in each of the above-described embodiments, the game image representing the game space including the player character 100 is displayed on the LCD 12. However, the game image including the player character 100 may be displayed on the LCD 14 provided with the touch panel 22 as shown in FIG. 22. In this case, the player can control the movement of the player character 100 by viewing the player character 100 near the stick 24, including his fingers, a stylus pen, etc.

In addition, although in each of the above-described embodiments, the player character 100 is a plane displayed so as to fly toward the depth of the screen, how and what kind of the player character 100 is displayed is changed as necessary. For example, in a case of a game in which the player character 100 is displayed so as to be overlooked also, the player character 100 can be operated in a similar manner. For example, in a case that the player character 100 is a character of a man, the movement parameter corresponding to the angle between the two points is not referred to as a turning angle, but a direction (direction of a body) to be moved.

In addition, in each of the above-described embodiments, out of the movement parameter, the travel speed is brought into correspondence with the distance between the two points, and the turning angle is brought into correspondence with the angle between the two points. That is, the distance or change in distance between the two pointing positions corresponds to the travel speed, and the angle or change in angle between the two pointing positions corresponds to the turning angle, and therefore, this offers the player the advantage of intuitively controlling the movement of the player character 100, and making the operation very easy. However, the correspondence between the movement parameter and the pointing state of the two points is changeable as necessary. In another embodiment, for example, the travel speed is brought into correspondence with the angle between the two points, and the turning angle is brought into correspondence with the distance between the two points.

In addition, in each of the above-described embodiments, a travel speed, a turning angle, and a display position are employed as the movement parameter of the player character 100. However, the movement parameter is any elements that permit controlling the movement of the player character 100, and can be changed as necessary. For example, if the player character 100 is a body of rotation such as a top, the movement parameter may be a rotational velocity and a moving direction. Or, the movement parameter may be a temporarily variable or adjustable ability value of the player character 100 such as offensive power, defensive power in battle, or running power, fighting spirit in competition.

It is noted that although the first LCD 12 and the second LCD 14 are vertically arranged in each of the above-described embodiments, the arrangement of the two LCDs may be changed as necessary. In the game apparatus 10 of another embodiment, the first LCD 12 and the second LCD 14 may horizontally be arranged.

Furthermore, although two LCDs each displaying a screen are provided in each of the above-described embodiments, the number of the LCDs as a display portion may be changed as necessary. In the game apparatus 10 of the other embodiment, it is appropriate that one LCD in the vertically long shape is provided, and by vertically dividing the area, the touch panel 22 is provided on any side of the area. Thus, it is possible to display two game images on the respective areas. Or, it is appropriate that one LCD in the horizontally long shape is provided, and by horizontally dividing the area, the touch panel 22 is provided on either side of the area. Thus, it is possible to display two game images on the respective areas.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus utilizing a touch panel, comprising:
    a display to display a game space including a character to be operated by a player;
    a touch panel operable by said player and capable of simultaneous detection of at least two pointing positions;
    a coordinates detector to detect coordinate values of the two pointing positions detected according to an operation of said touch panel by said player;
    a positional relationship calculator to calculate at least one of a distance between said two pointing positions detected by said coordinates detector and an angle of a line connecting said two pointing positions,
    movement parameter setting programmed logic circuitry to set a movement parameter of said character on the basis of at least one of the distance and angle calculated by said positional relationship calculator and to change a travel speed as said movement parameter on the basis of the change amount of said distance; and
    a character controller to control a movement of said character on the basis of the movement parameter set by said movement parameter setting programmed logic circuitry.

2. A game apparatus utilizing touch panel according to claim 1, wherein said movement parameter setting programmed logic circuitry is operable to change a turning angle as said movement parameter on the basis of the change amount of said angle.

3. A game apparatus utilizing a touch panel, comprising:
    a display to display a game space including a character to be operated by a player;
    a touch panel operable by said player and capable of simultaneous detection of at least two pointing positions;
    a coordinates detector to detect coordinate values of the two pointing positions detected according to an operation of said touch panel by said player;
    a positional relationship calculator to calculate at least one of a distance between said two pointing positions detected by said coordinates detector and an angle of a line connecting said two pointing positions,
    movement parameter setting programmed logic circuitry to set a movement parameter of said character on the basis of at least one of the distance and angle calculated by said positional relationship calculator and to set a travel speed as said movement parameter on the basis of said distance; and
    a character controller to control a movement of said character on the basis of the movement parameter set by said movement parameter setting programmed logic circuitry.

4. A game apparatus utilizing touch panel according to claim 3, wherein said movement parameter setting programmed logic circuitry is operable to set a measure and direction of a turning angle as said movement parameter on the basis of the measure and direction of said angle.

5. A computer readable storage medium tangibly storing instructions executable by a computer to perform a method of operating a game apparatus utilizing a touch panel, the method comprising:
    displaying a game space including a character to be operated by a player on a display;
    simultaneously detecting at least two pointing positions on the touch panel operable by said player;
    detecting coordinate values of the two pointing positions detected according to an operation of said touch panel by said player;
    calculating at least one of a distance between said two detected pointing positions and an angle of a line connecting said two detected pointing positions,
    setting a movement parameter of said character on the basis of at least one of the calculated distance and angle and changing a travel speed as said movement parameter on the basis of the change amount of said distance; and
    controlling a movement of said character on the basis of the set movement parameter.

6. A method of operating a game apparatus utilizing a touch panel, the method comprising:
    displaying a game space including a character to be operated by a player on a display;
    simultaneously detecting at least two pointing positions on the touch panel operable by said player;
    detecting coordinate values of the two pointing positions detected according to an operation of said touch panel by said player;
    calculating at least one of a distance between said two detected pointing positions and an angle of a line connecting said two detected pointing positions,
    setting a movement parameter of said character on the basis of at least one of the calculated distance and angle and setting a travel speed as said movement parameter on the basis of the change amount of said distance; and
    controlling a movement of said character on the basis of the set movement parameter.

7. A computer readable storage medium tangibly storing instructions executable by a computer to perform a method of operating a game apparatus utilizing a touch panel, the method comprising:
    displaying a game space including a character to be operated by a player on a display;
    simultaneously detecting at least two pointing positions on the touch panel operable by said player;
    detecting coordinate values of the two pointing positions detected according to an operation of said touch panel by said player;
    calculating at least one of a distance between said two detected pointing positions and an angle of a line connecting said two detected pointing positions;
    setting a movement parameter of said character on the basis of at least one of the calculated distance and angle and setting a travel speed as said movement parameter on the basis of said distance; and
    controlling a movement of said character on the basis of the set movement parameter.

8. A method of operating a game apparatus utilizing a touch panel, the method comprising:
    displaying a game space including a character to be operated by a player on a display;
    simultaneously detecting at least two pointing positions on the touch panel operable by said player;
    detecting coordinate values of the two pointing positions detected according to an operation of said touch panel by said player;
    calculating at least one of a distance between said two detected pointing positions and an angle of a line connecting said two detected pointing positions;
    setting a movement parameter of said character on the basis of at least one of the calculated distance and angle and setting a travel speed as said movement parameter on the basis of said distance; and
    controlling a movement of said character on the basis of the set movement parameter.

* * * * *